(12) United States Patent
Tang

(10) Patent No.: US 12,527,296 B2
(45) Date of Patent: *Jan. 20, 2026

(54) PET TOILET

(71) Applicant: PETPIVOT INC, Portland, OR (US)

(72) Inventor: Xiaoxiang Tang, Guangdong (CN)

(73) Assignee: PETPIVOT INC, Portland, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/089,184

(22) Filed: Mar. 25, 2025

(65) Prior Publication Data

US 2025/0221378 A1    Jul. 10, 2025

Related U.S. Application Data

(63) Continuation-in-part of application No. 18/431,475, filed on Feb. 2, 2024, and a continuation-in-part of application No. 18/541,428, filed on Dec. 15, 2023.

(30) Foreign Application Priority Data

| Nov. 24, 2023 | (CN) | 202323196077.4 |
| Jan. 26, 2024 | (CN) | 202420199695.X |
| Mar. 17, 2025 | (CN) | 202520468357.6 |

(51) Int. Cl.
*A01K 1/01*    (2006.01)

(52) U.S. Cl.
CPC .................. *A01K 1/0114* (2013.01)

(58) Field of Classification Search
CPC .... A01K 1/0107; A01K 1/0114; A01K 1/011; B07B 1/42; B07B 1/00
See application file for complete search history.

(56) References Cited

U.S. PATENT DOCUMENTS

| 2007/0089679 A1* | 4/2007 | Horanoff | A01K 1/0114 |
| | | | 119/166 |
| 2017/0068356 A1* | 3/2017 | Pance | G06F 1/1616 |
| 2020/0060221 A1* | 2/2020 | Fan | A01K 1/0114 |

(Continued)

FOREIGN PATENT DOCUMENTS

| CN | 217905656 U | * 11/2022 | |
| CN | 117378509 A | *  1/2024 | ............. A01K 1/011 |
| CN | 118383278 A | *  7/2024 | ........... A01K 1/0107 |

(Continued)

*Primary Examiner* — Peter M Poon
*Assistant Examiner* — Shada Mohamed Alghailani

(57) ABSTRACT

The present invention provides a pet toilet, when the rotary drum rotates from the initial position to the discharge position, the pet litter can enter the third accommodating space through the sieve component, and the excreta is limited outside the third accommodating space to achieve the sieving of the pet litter and the pet excreta. The excreta can be discharged through the first opening via the excreta's own gravity, completing separation and collection of the excreta. After the excreta is discharged, when the rotary drum rotates towards the initial position from the discharge position, the pet litter in the third accommodating space can pass through the sieve component and fall back into the first accommodating space via the pet litter's own gravity. Moreover, since the rotary drum is supported by the base, the rotary drum is capable of rotating more smoothly.

16 Claims, 36 Drawing Sheets

(56) References Cited

U.S. PATENT DOCUMENTS

2020/0281154 A1\* 9/2020 Li ......................... A01K 1/011
2024/0237619 A1\* 7/2024 Brooks ................ A01K 5/0291

FOREIGN PATENT DOCUMENTS

| | | | | | |
|---|---|---|---|---|---|
| CN | 119087838 | A | \* | 12/2024 | |
| KR | 20200053769 | A | \* | 5/2020 | |
| KR | 20230000035 | U | \* | 1/2023 | |
| WO | WO-02054860 | A1 | \* | 7/2002 | ............. A01K 1/011 |
| WO | WO-2022002026 | A1 | \* | 1/2022 | |

\* cited by examiner

PET TOILET

CROSS-REFERENCE TO RELATED APPLICATIONS

This application is a Continuation-in-Part of the U.S. application Ser. No. 18/431,475, filed on Feb. 2, 2024, which is the a Continuation-in-Part of the U.S. application Ser. No. 18/541,428, filed on Dec. 15, 2023, and the application also claims priority to Chinese Patent Application CN202520468357.6, filed on Mar. 17, 2025, entire disclosures of which are incorporated herein by references.

TECHNICAL FIELD

The present invention relates to a field of pet toilets, in particular to a pet toilet.

BACKGROUND ART

Currently, most pet toilets are in ordinary containers, such as cat litter boxes, and the cat litter boxes contain litter for pets to defecate. However, after defecation, pet owners need to clean up the excreta, which is not only time-consuming and laborious, but also difficult for the pet owners to accept the odor. Therefore, there is an urgent need to provide an intelligent cat litter box on the market to automatically clean excreta and improve user experience.

SUMMARY

In order to overcome the shortcomings of the prior art, the present invention provides a pet toilet, which includes a rotary drum, a base, a sieve component, a drive device and a proximity sensor switch.

The rotary drum being equipped with a first opening and a first accommodating space; wherein the first opening is in communication with the first accommodating space, and the first accommodating space is configured to accommodate pet excreta and pet litter.

The rotary drum being supported by the base; wherein a gap portion is disposed between the base and the rotary drum.

The sieve component being connected to the rotary drum; wherein the sieve component and an inner wall of the rotary drum together surround to form a third accommodating space, the third accommodating space is adjacent to the first accommodating space, and the sieve component is configured to sieve the pet litter and the excreta.

The drive device being configured to drive the rotary drum to rotate on a first support arm and a second support arm; wherein when the first opening rotates with the rotary drum from an initial position to a discharge position, the pet litter can enter the third accommodating space through the sieve component, and the excreta is limited outside the third accommodating space, so that the excreta can be discharged through the first opening via the excreta's own gravity; when the first opening rotates towards the initial position with the rotary drum from the discharge position, the pet litter in the third accommodating space can pass through the sieve component and fall back into the first accommodating space via the pet litter's own gravity.

The proximity sensor switch being disposed on the base; wherein the proximity sensor switch is arranged around the gap portion; the proximity sensor switch is electrically connected to the drive device; when the proximity sensor switch is triggered, the drive device stops operating.

Beneficial effects of the present invention are as follows.

Through the above structure, when the rotary drum rotates from the initial position to the discharge position, the pet litter can enter the third accommodating space through the sieve component, and the excreta is limited outside the third accommodating space to achieve the sieving of the pet litter and the pet excreta. The excreta can be discharged through the first opening via the excreta's own gravity, completing separation and collection of the excreta. After the excreta is discharged, when the rotary drum rotates towards the initial position from the discharge position, the pet litter in the third accommodating space can pass through the sieve component and fall back into the first accommodating space via the pet litter's own gravity. Moreover, since the rotary drum is supported by the base, the rotary drum is capable of rotating more smoothly. Moreover, since the proximity sensor switch is disposed on the base and is arranged around the gap portion, and the proximity sensor switch is electrically connected to the drive device, when the proximity sensor switch is triggered, the drive device stops operating. Thus, when a pet approaches the gap portion, the proximity sensor switch will be triggered first, and the drive device will stop operating, thereby preventing the pet's claws or body parts from being pinched and injured by being caught in the gap portion.

BRIEF DESCRIPTION OF THE DRAWINGS

Implementations of the present disclosure will now be described, by way of embodiment, with reference to the attached figures. It should be understood, the drawings are shown for illustrative purpose only, for ordinary person skilled in the art, other drawings obtained from these drawings without paying creative labor by an ordinary person skilled in the art should be within scope of the present disclosure.

DETAILED DESCRIPTION OF THE EMBODIMENTS

Embodiment I

Figure 1:
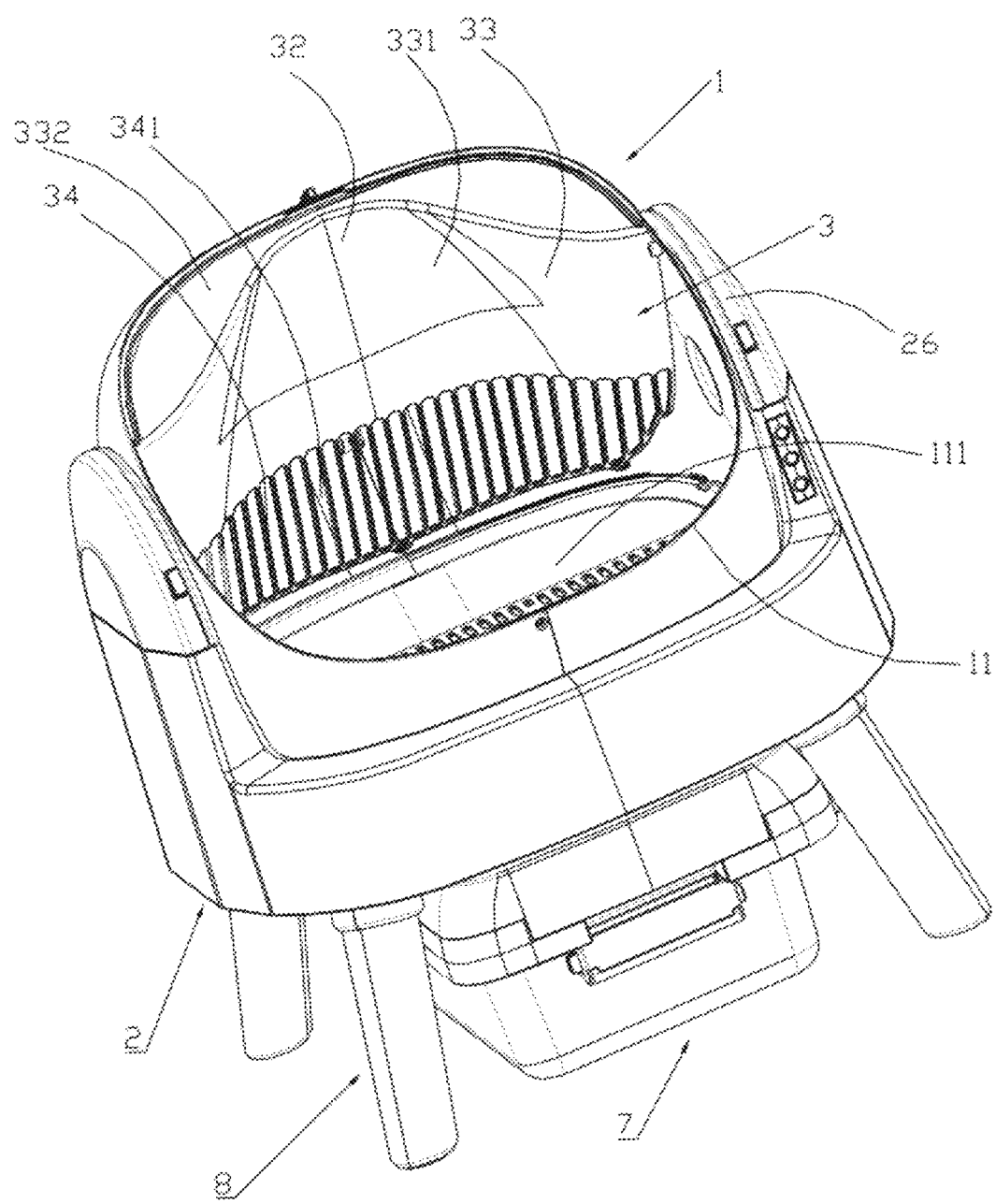
FIG. 1 is a schematic diagram of an overall structure of a rotary drum according to the present invention in an initial position.
Figure 2:
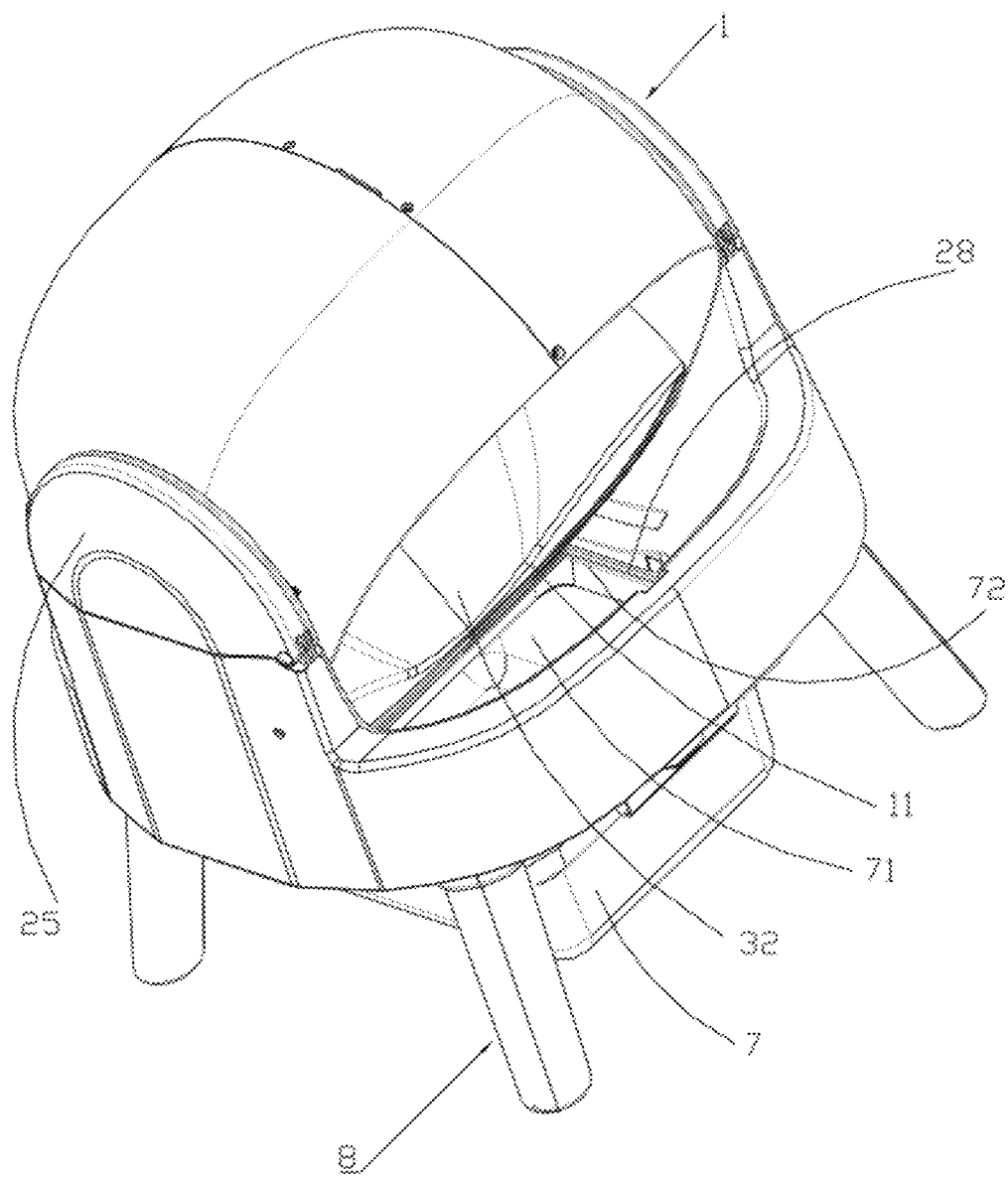
FIG. 2 is a schematic diagram of an overall structure of a rotary drum according to the present invention in a discharge position.
Figure 3:
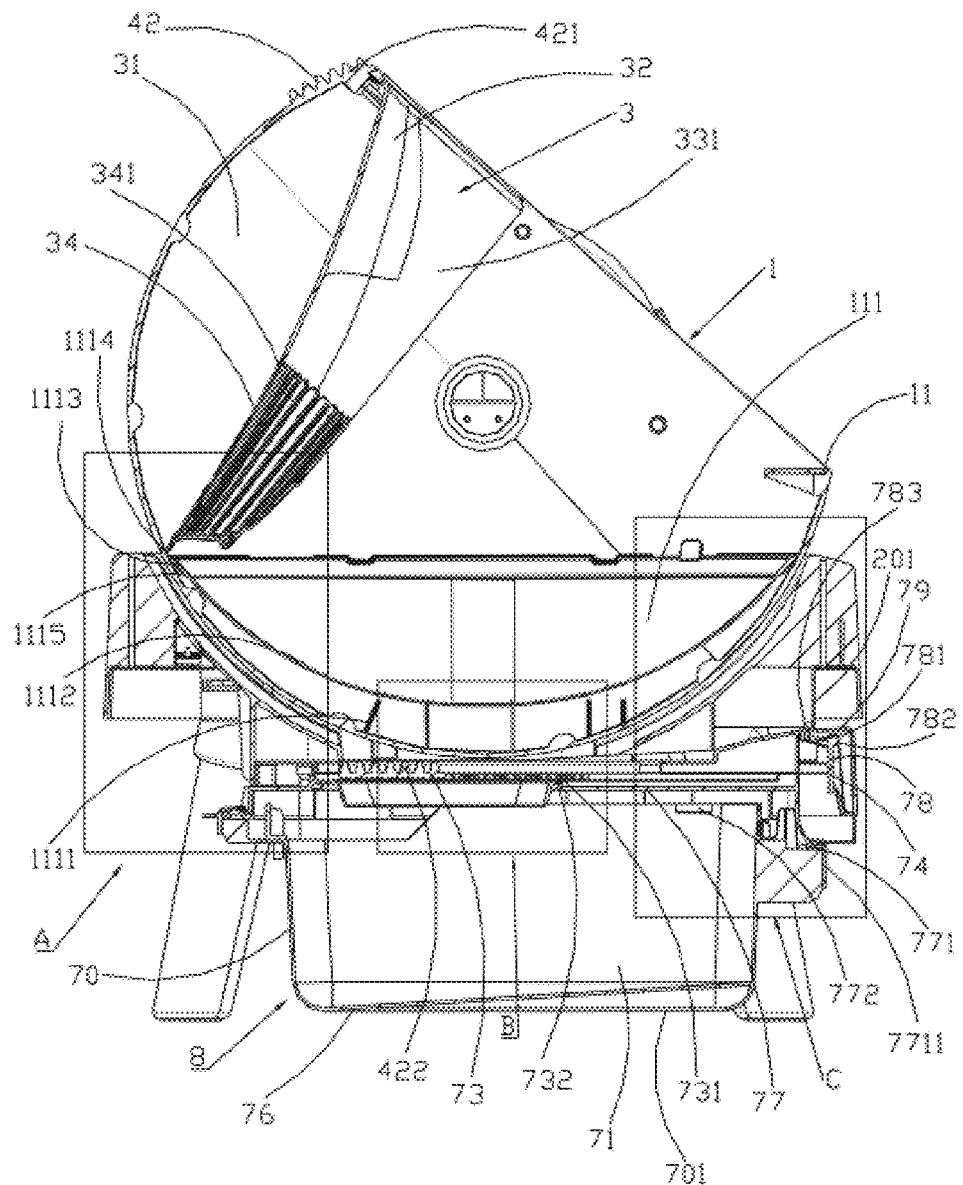
FIG. 3 is a sectional view of cutting along a rotary drum in an initial position.
Figure 4:
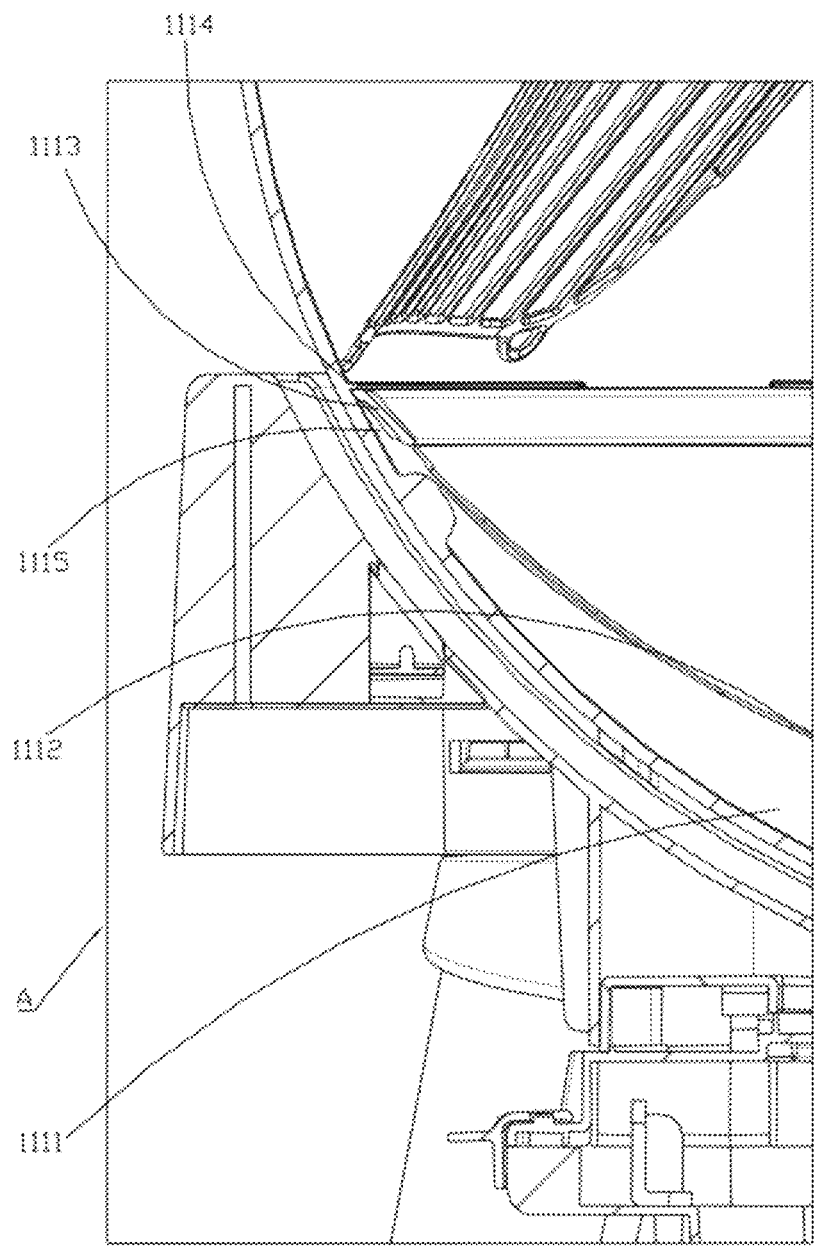
FIG. 4 is an enlarged view of area A in FIG. 3.
Figure 5:
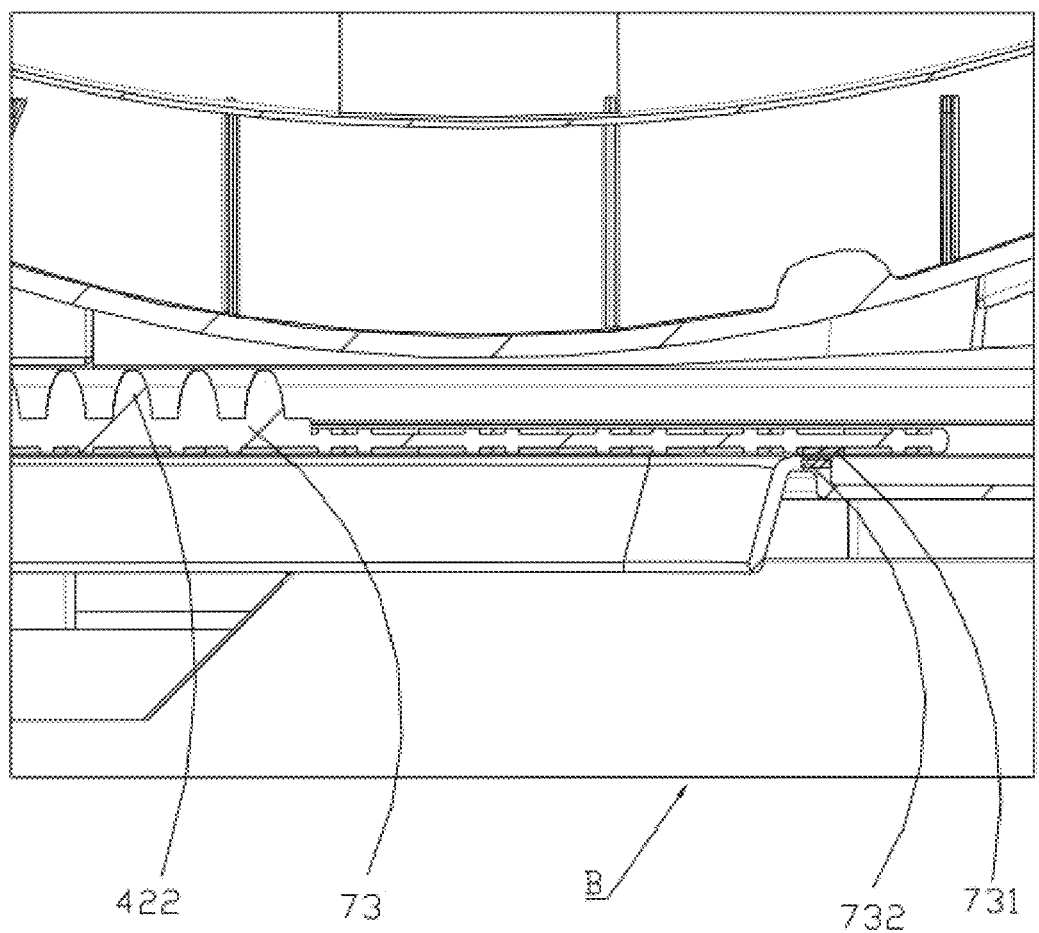
FIG. 5 is an enlarged view of area B in FIG. 3.
Figure 6:
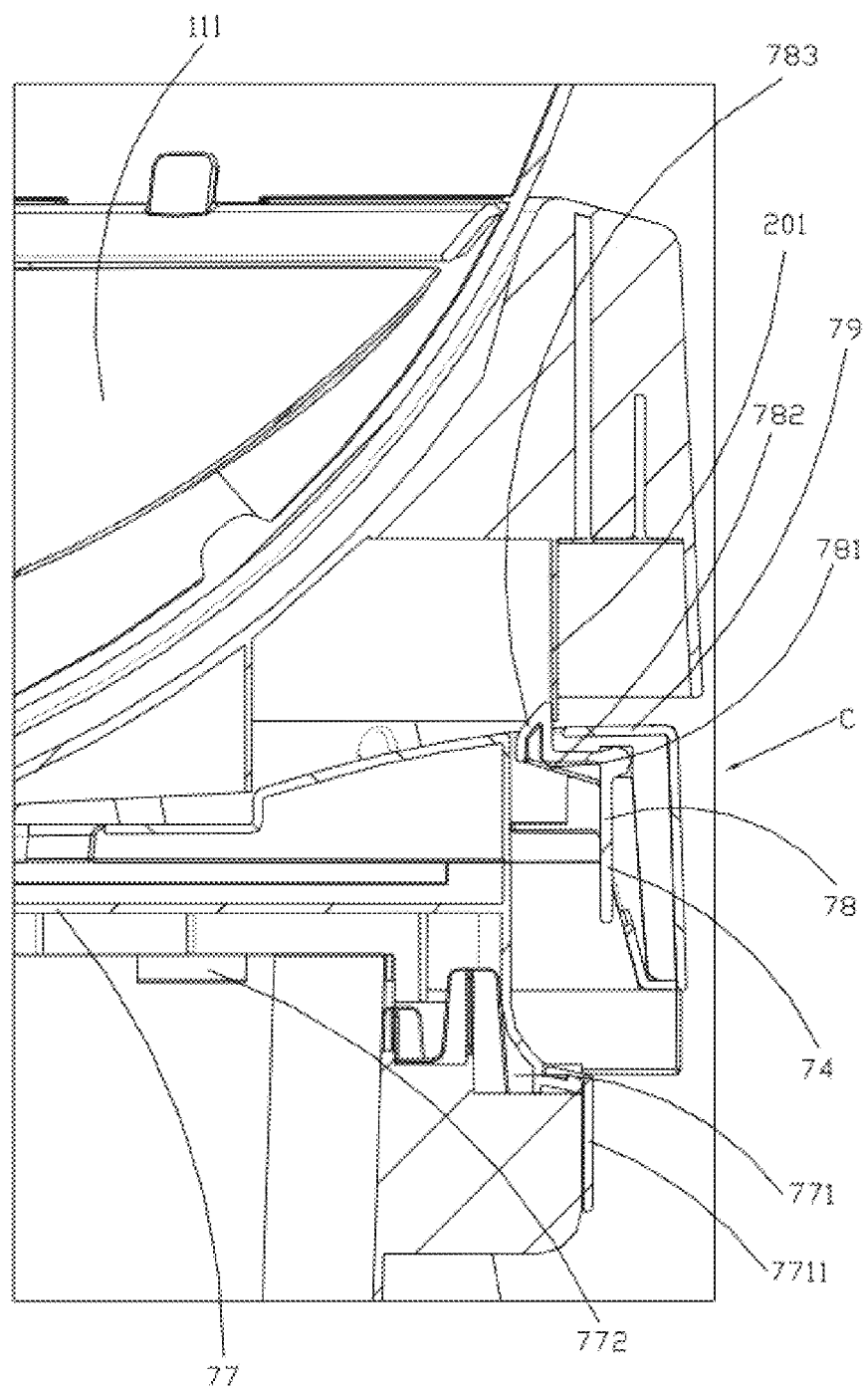
FIG. 6 is an enlarged view of area C in FIG. 3.
Figure 7:
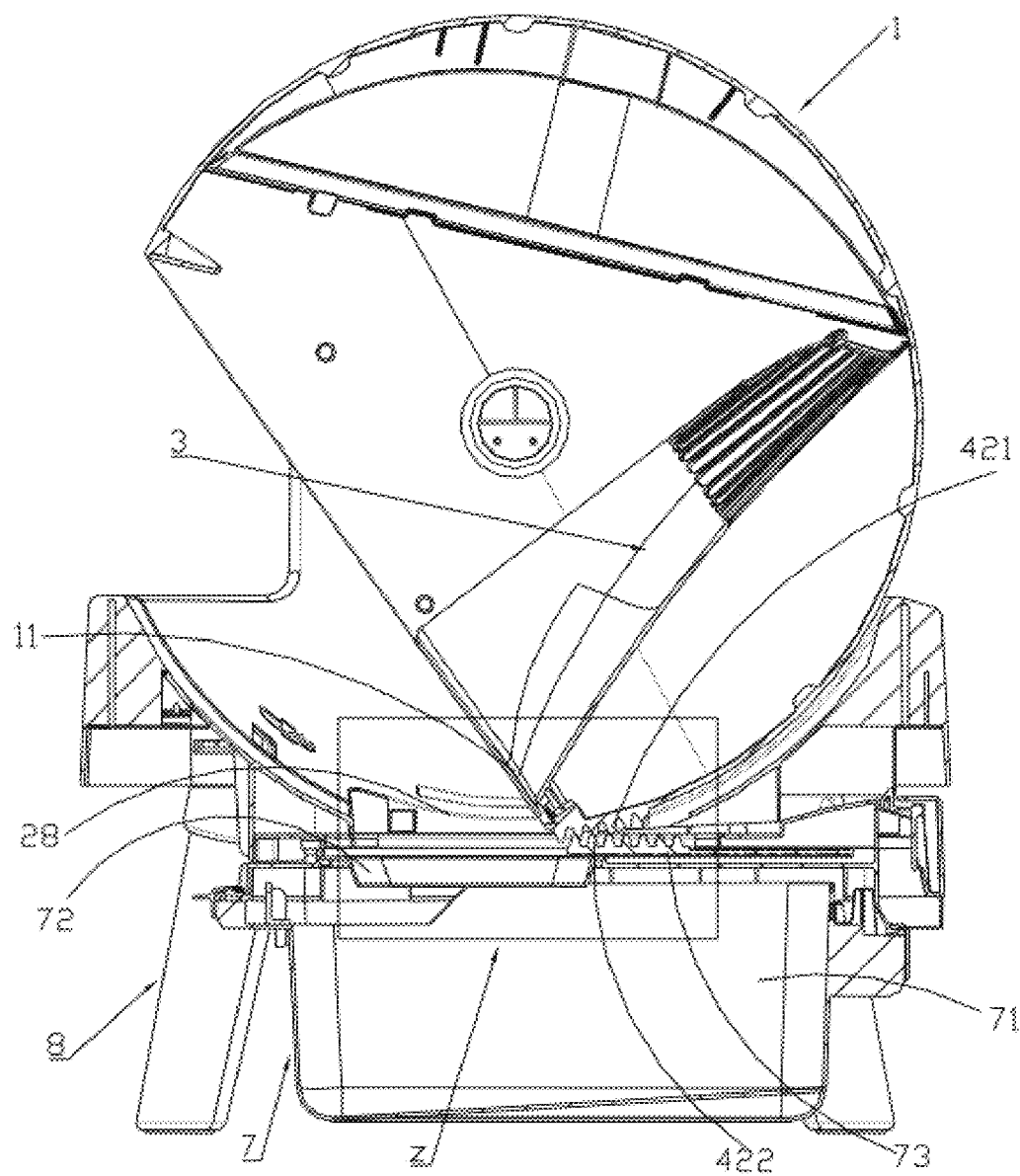
FIG. 7 is a sectional view of cutting along a rotary drum in a discharge position.
Figure 8:
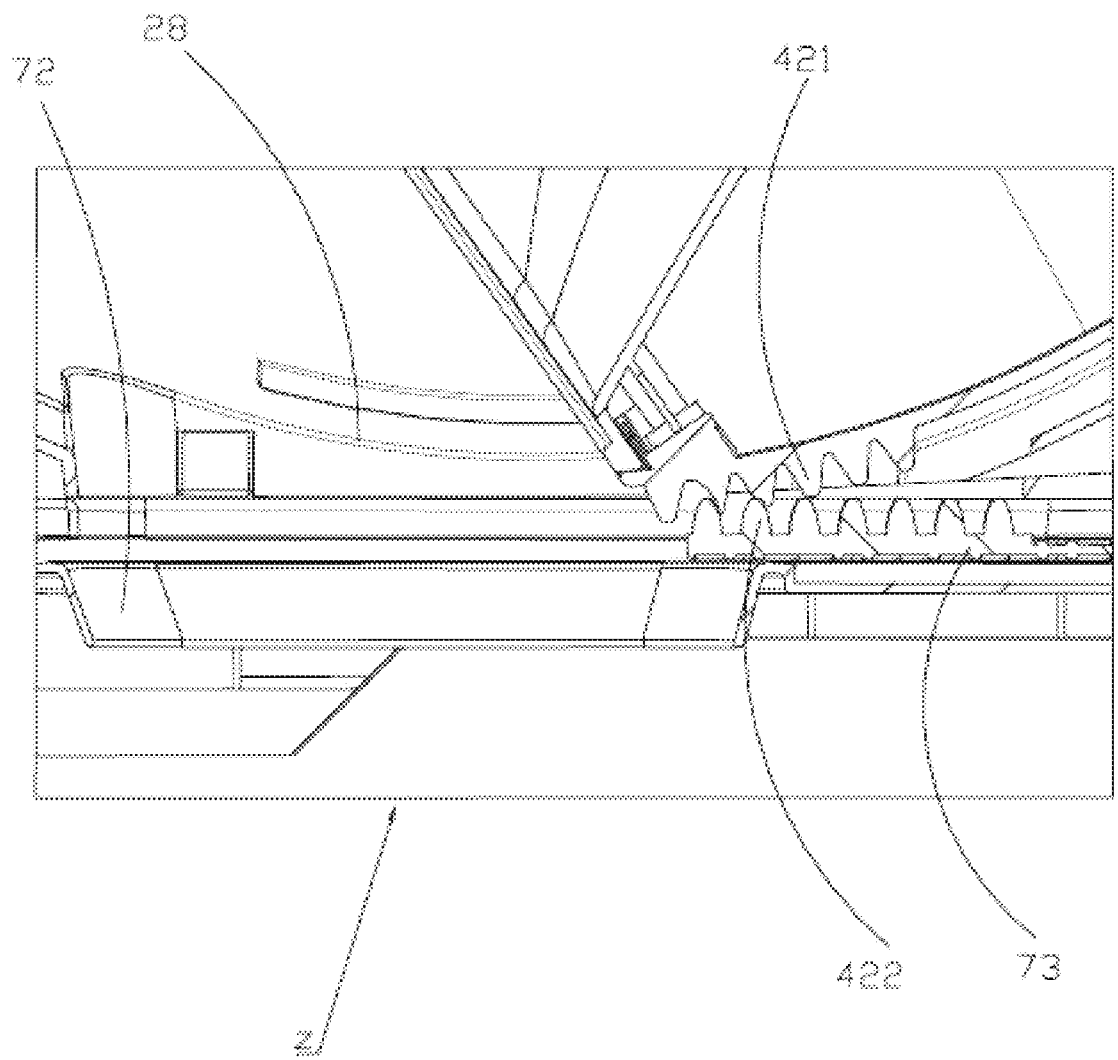
FIG. 8 is an enlarged view of area Z in FIG. 7.
Figure 9:
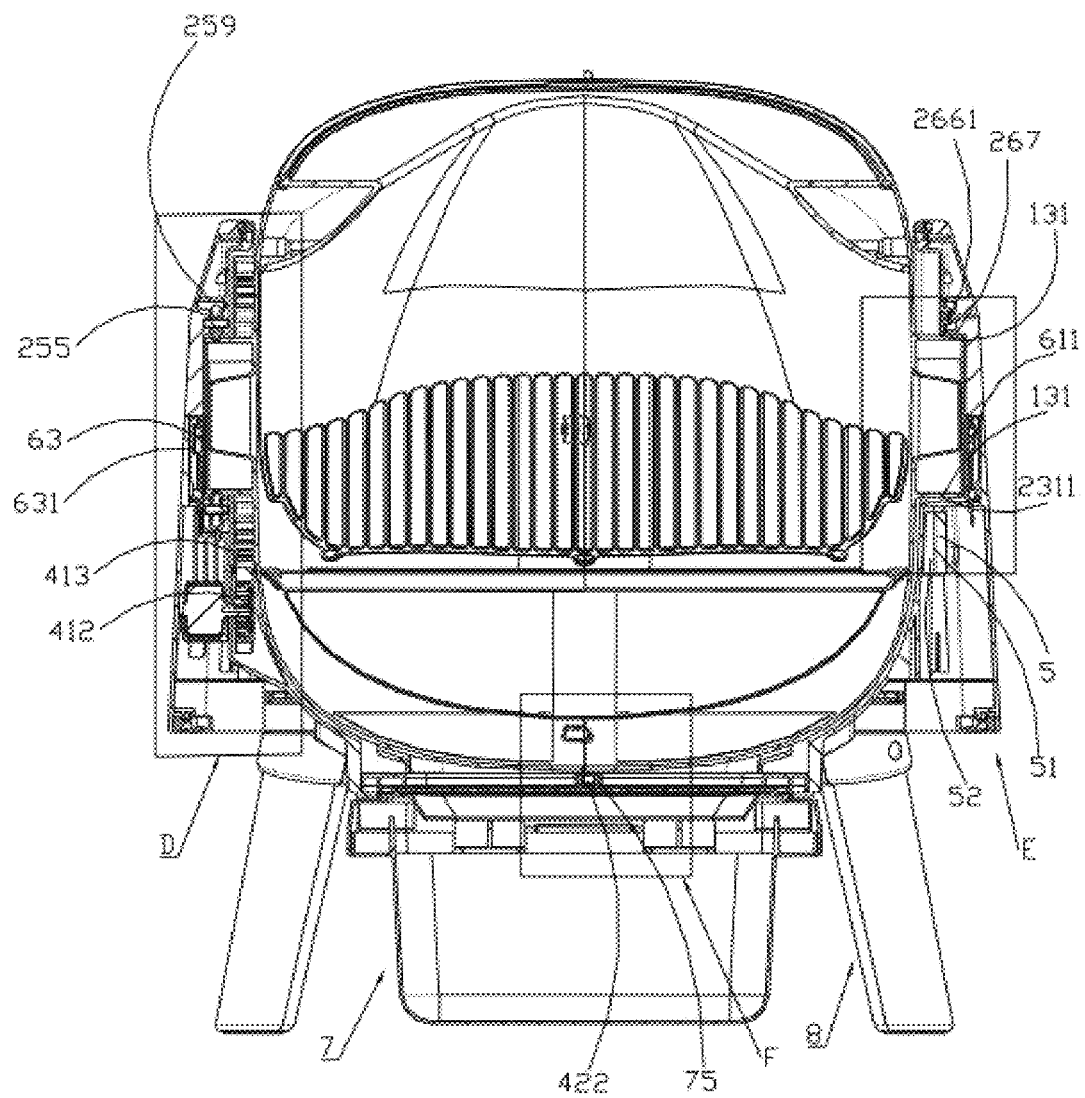
FIG. 9 is a sectional view of a rotary drum being cut along a main body, a first support arm and a second support arm in an initial position.
Figure 10:
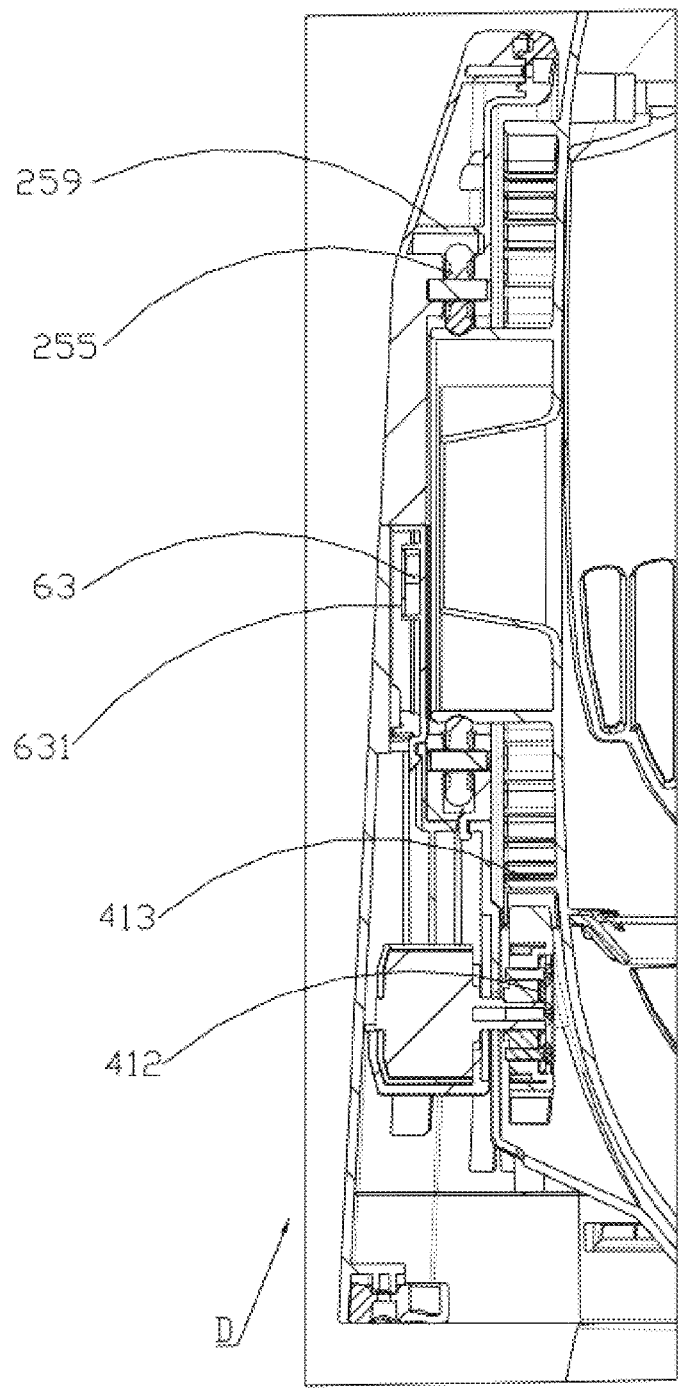
FIG. 10 is an enlarged view of area D in FIG. 9.
Figure 11:
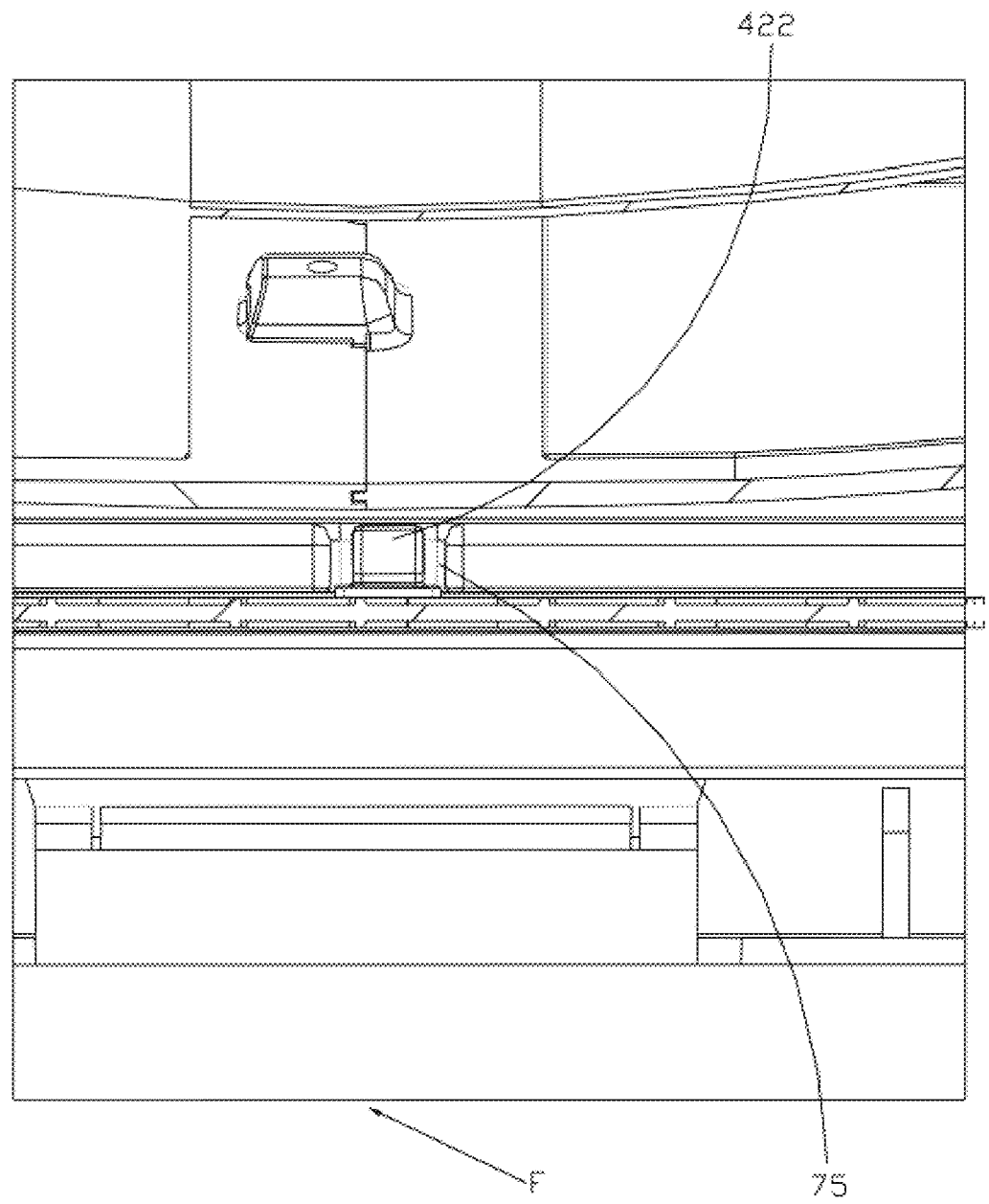
FIG. 11 is an enlarged view of area F in FIG. 9.
Figure 12:
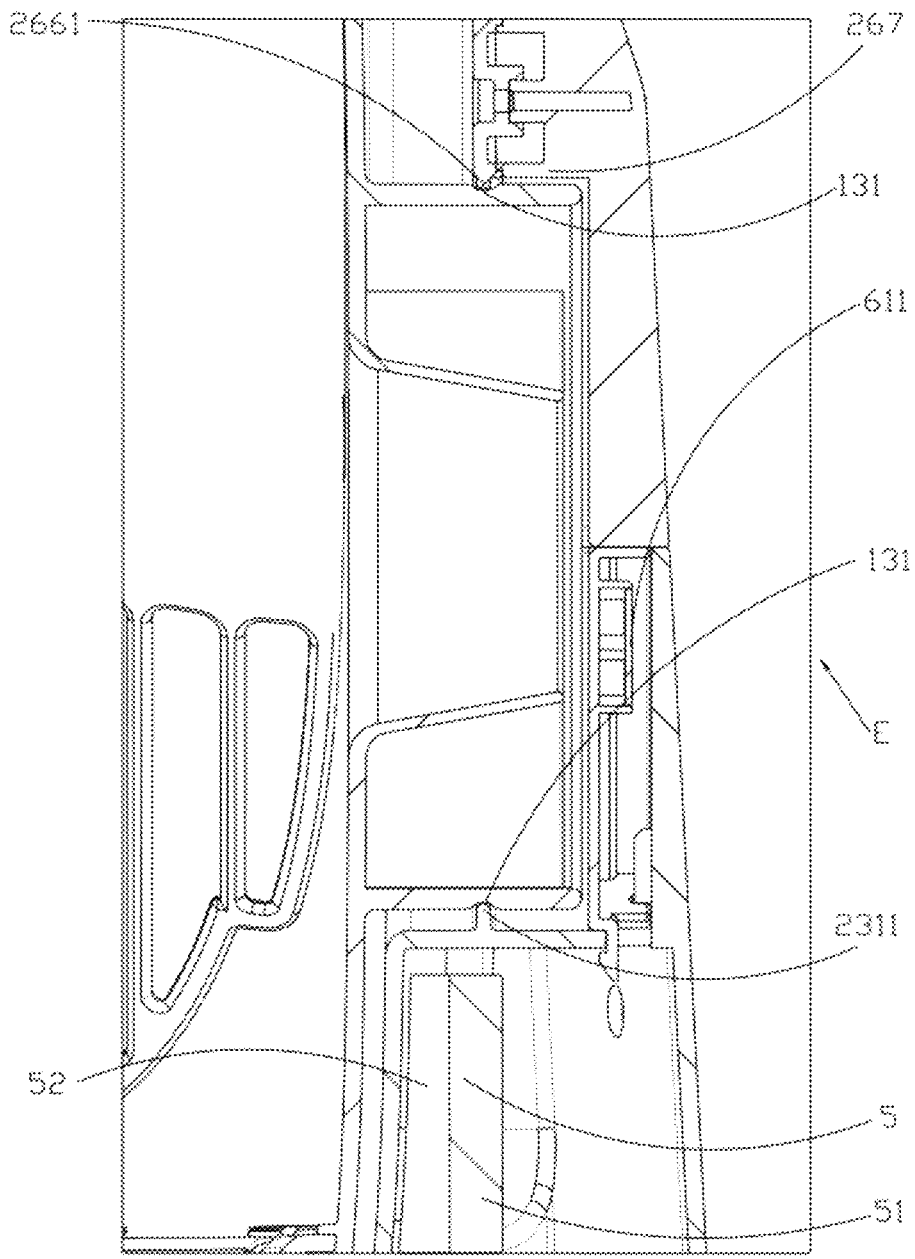
FIG. 12 is an enlarged view of area E in FIG. 9.
Figure 13:
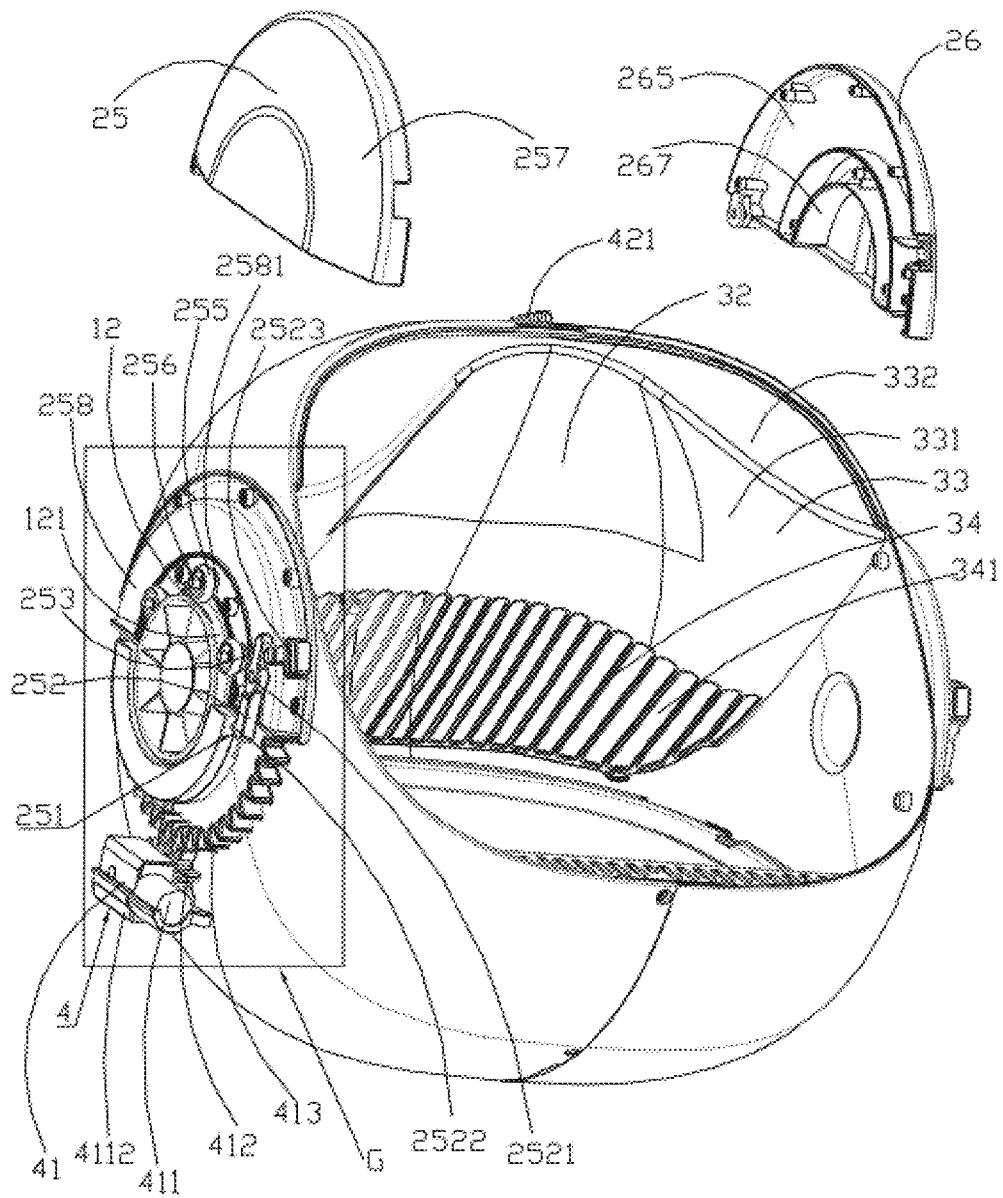
FIG. 13 is a schematic diagram of a structure of a rotary drum and a drive component.
Figure 14:
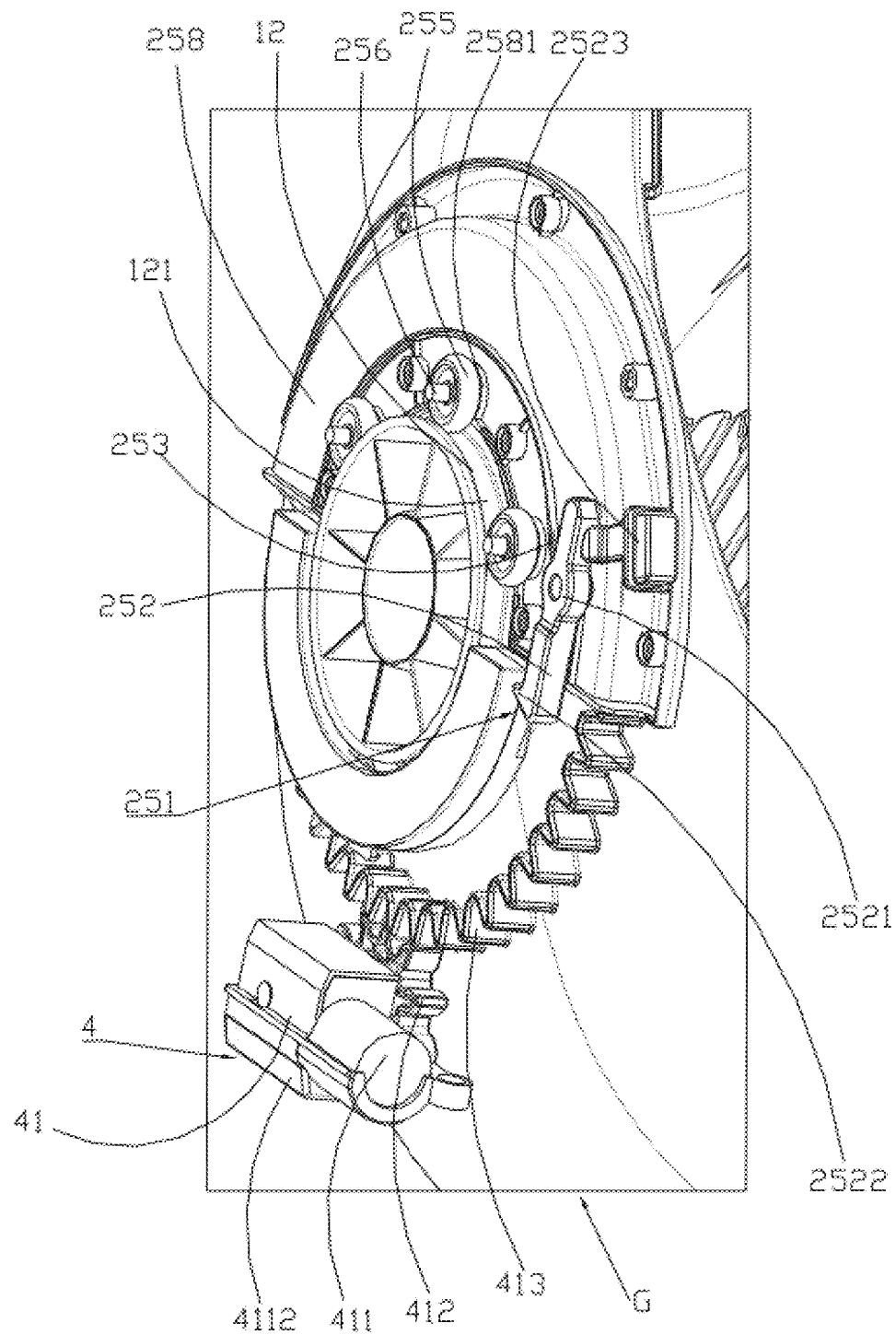
FIG. 14 is an enlarged view of area G in FIG. 13.
Figure 15:
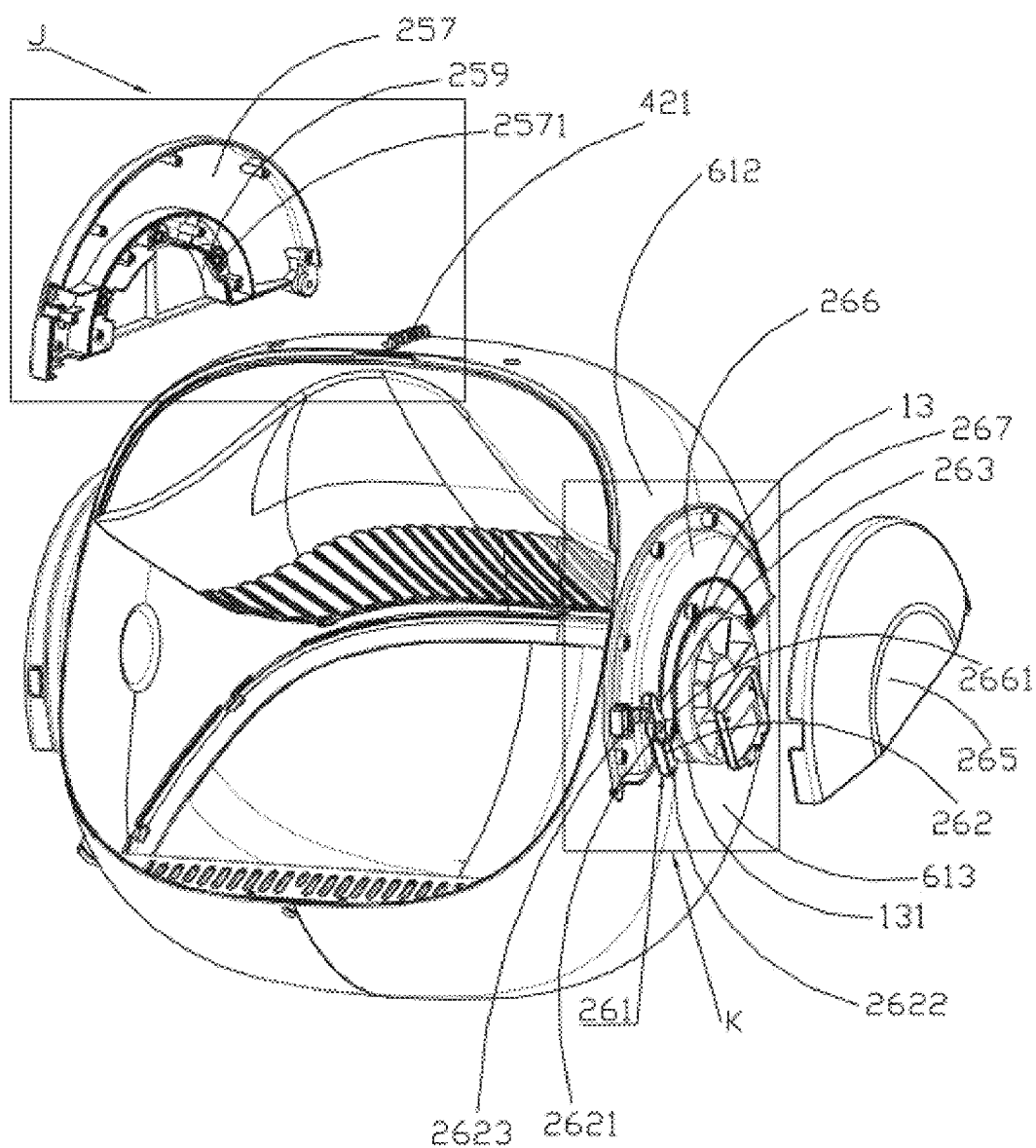
FIG. 15 is a schematic diagram of a structure of a rotary drum and a flip cover.
Figure 16:
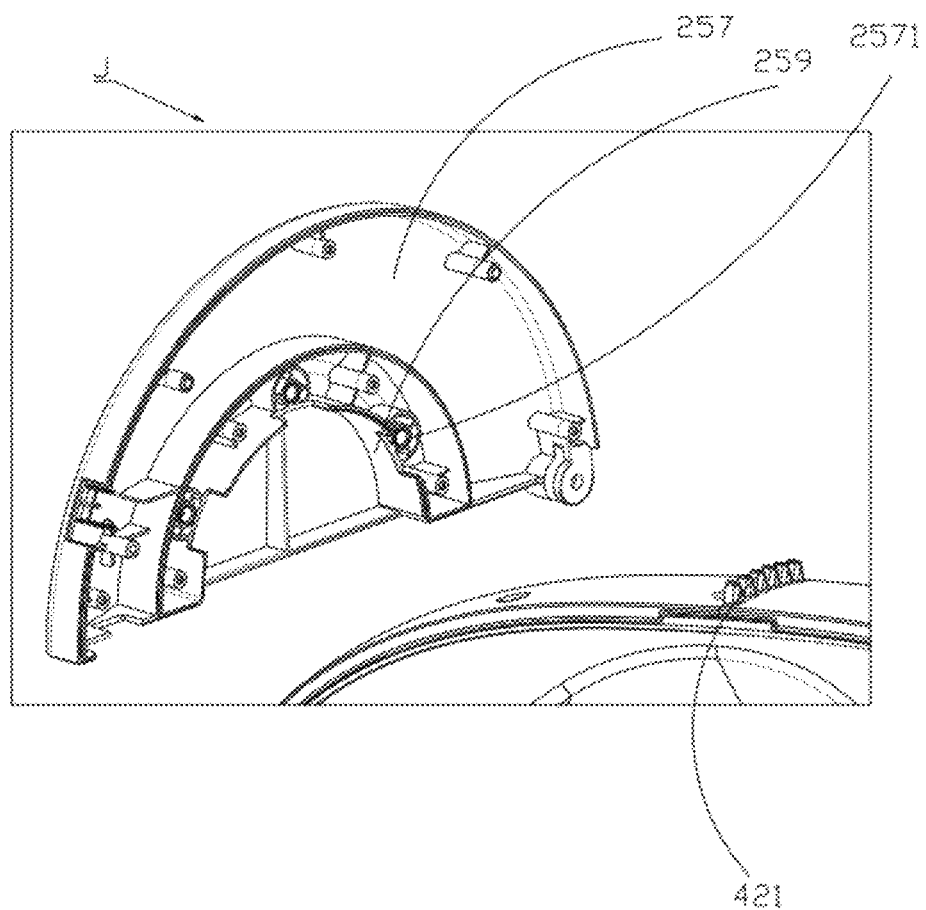
FIG. 16 is an enlarged view of area J in FIG. 15.
Figure 17:
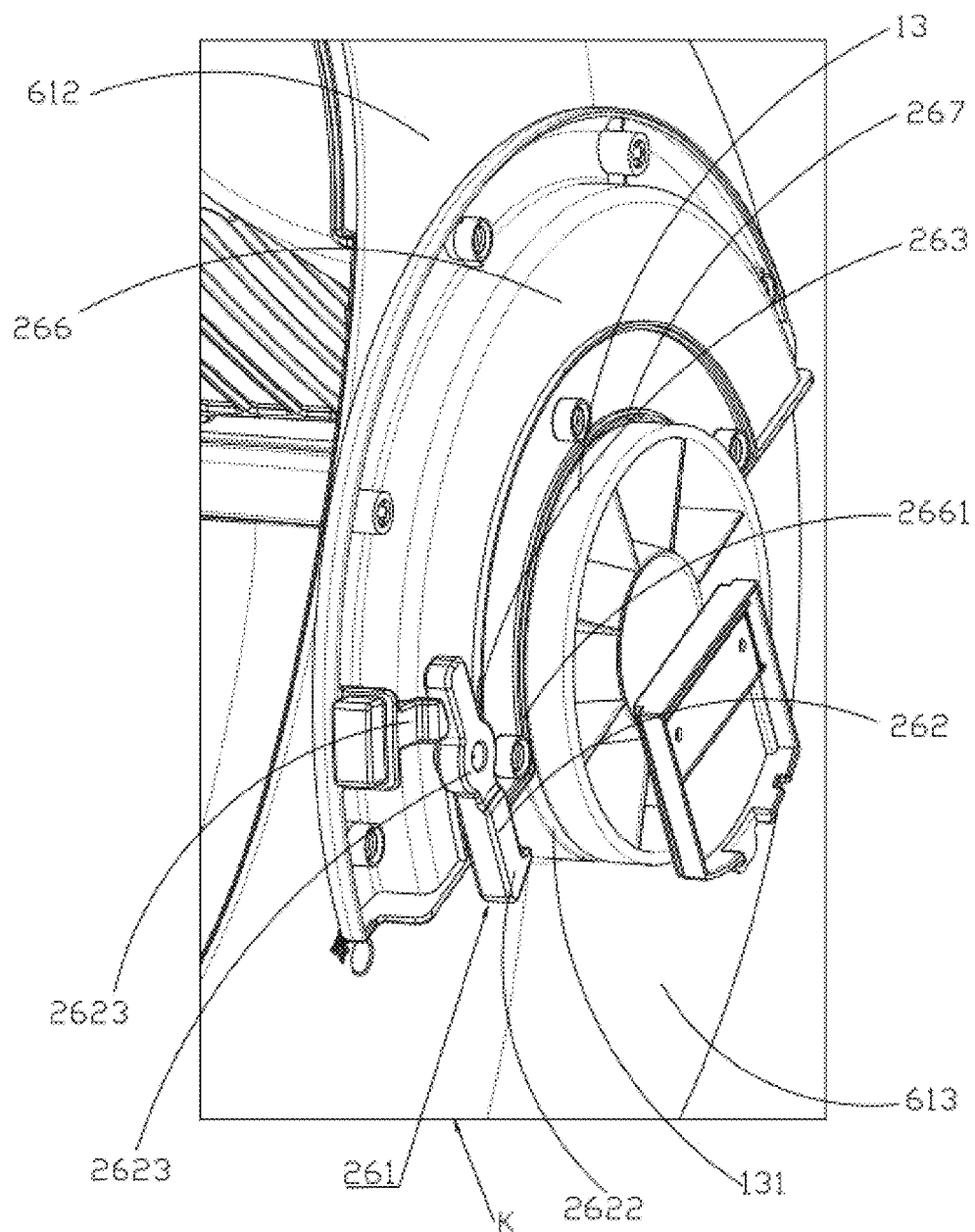
FIG. 17 is an enlarged view of area K in FIG. 15.
Figure 18:
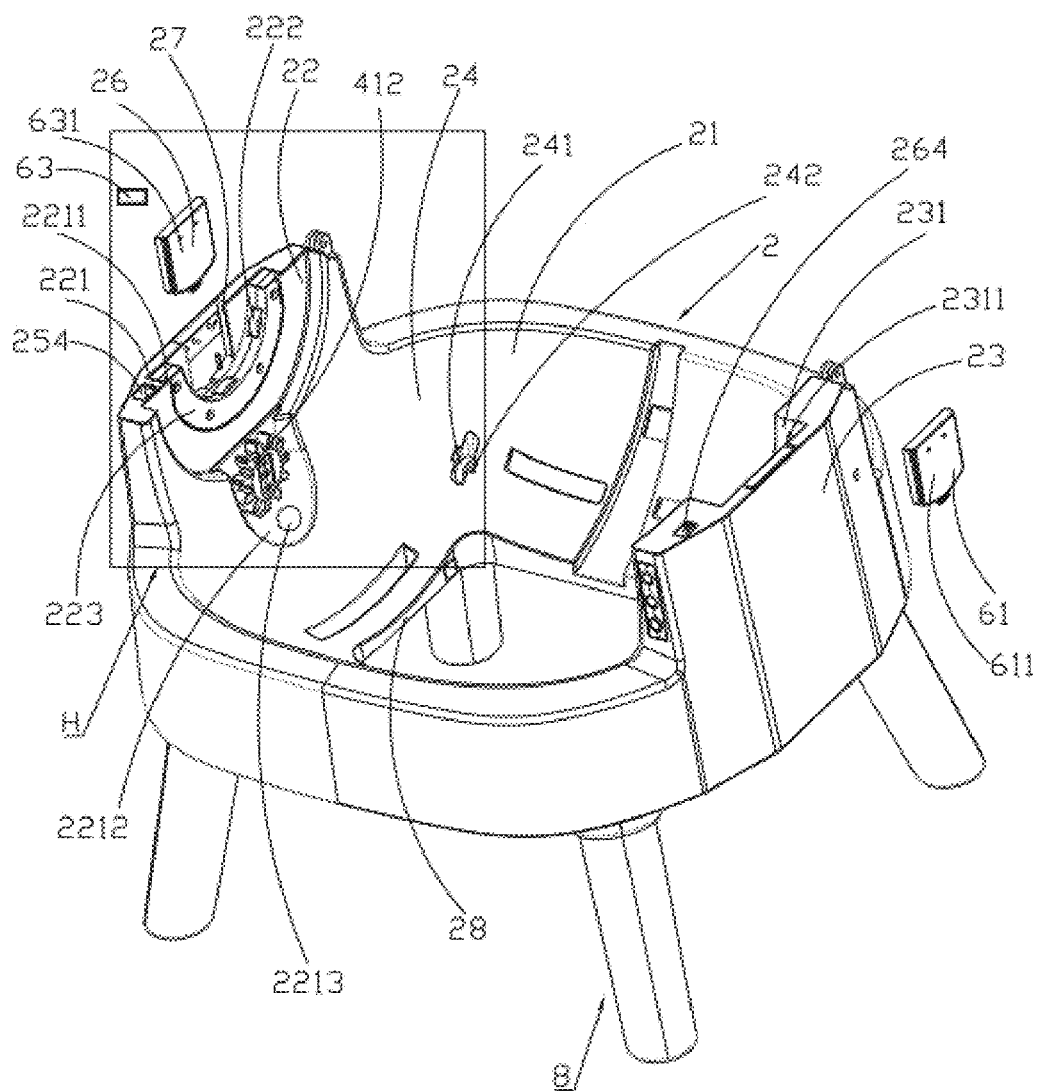
FIG. 18 is a schematic diagram of a structure of a base.
Figure 19:
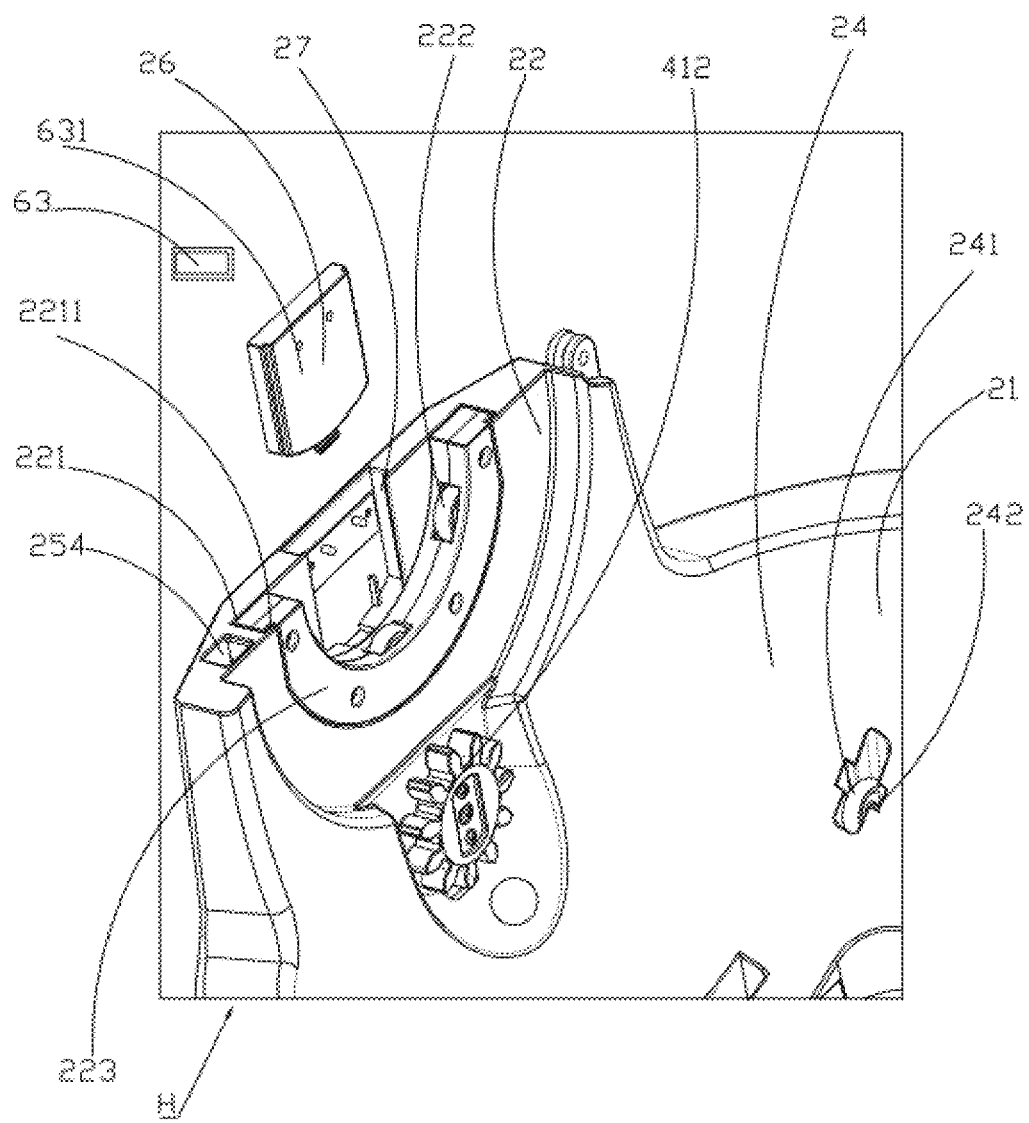
FIG. 19 is an enlarged view of area H in FIG. 18.
Figure 20:
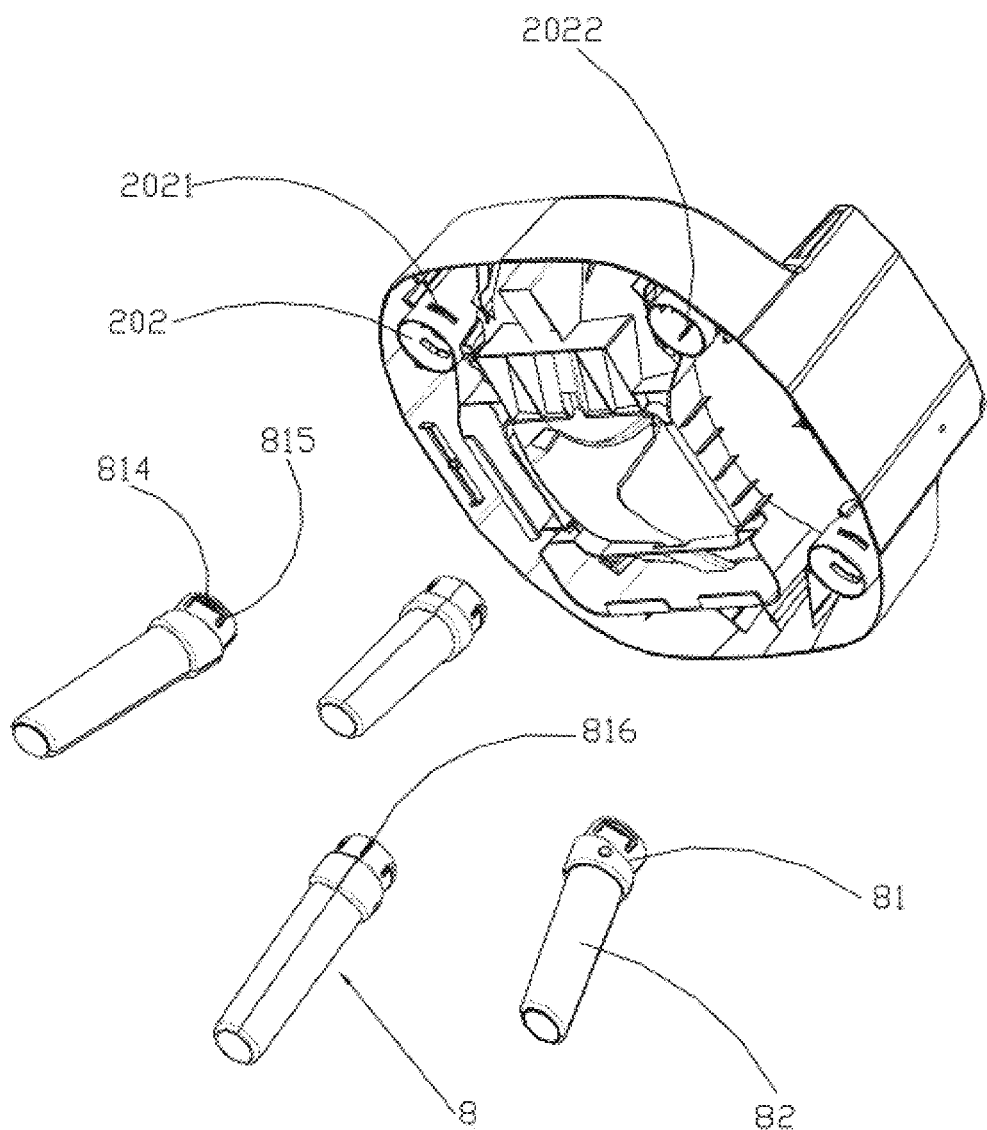
FIG. 20 is an exploded view of a base and support feet.
Figure 21:
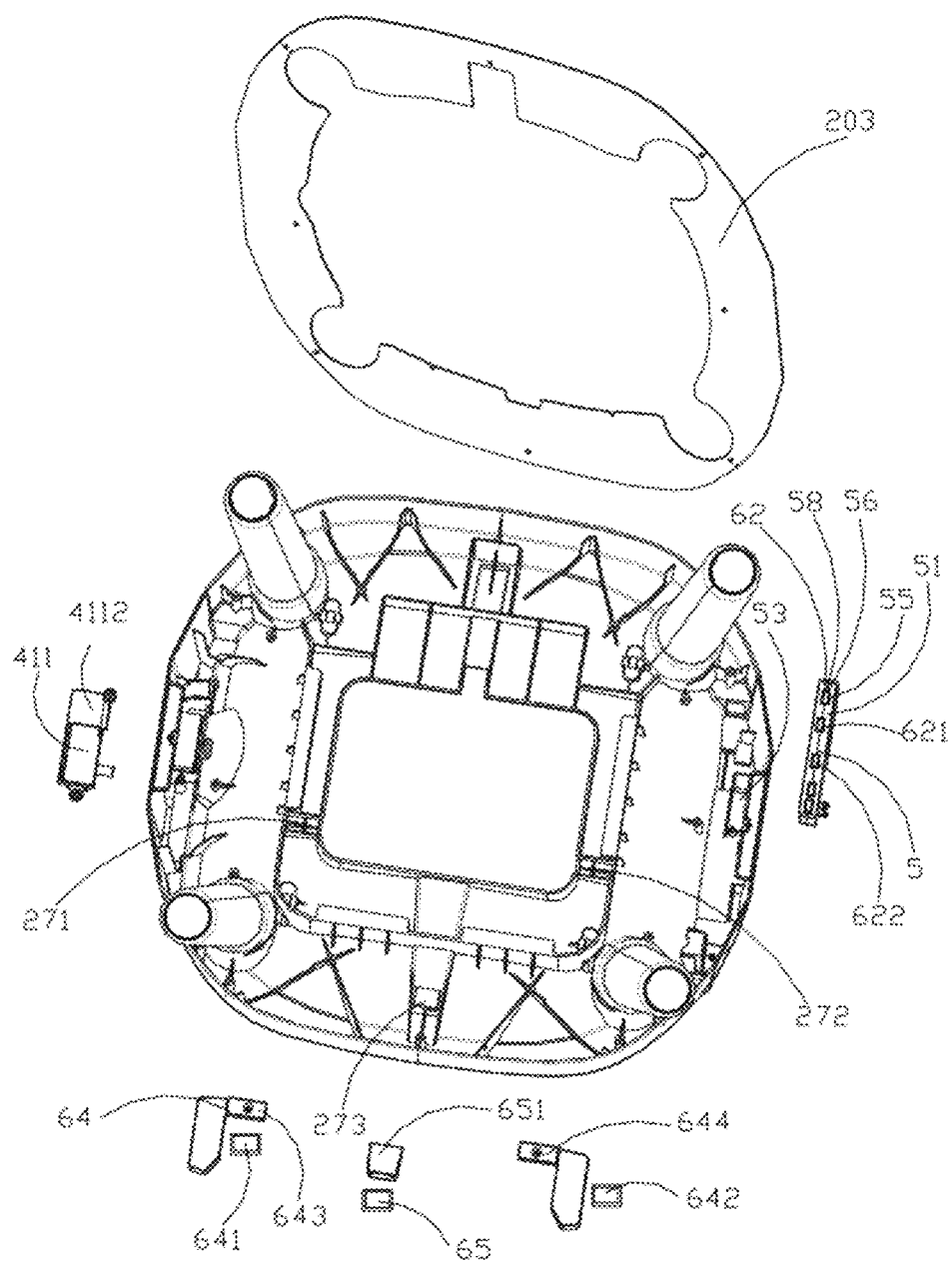
FIG. 21 is an exploded view of a base, support feet, a sealing plate, and a chassis.
Figure 22:
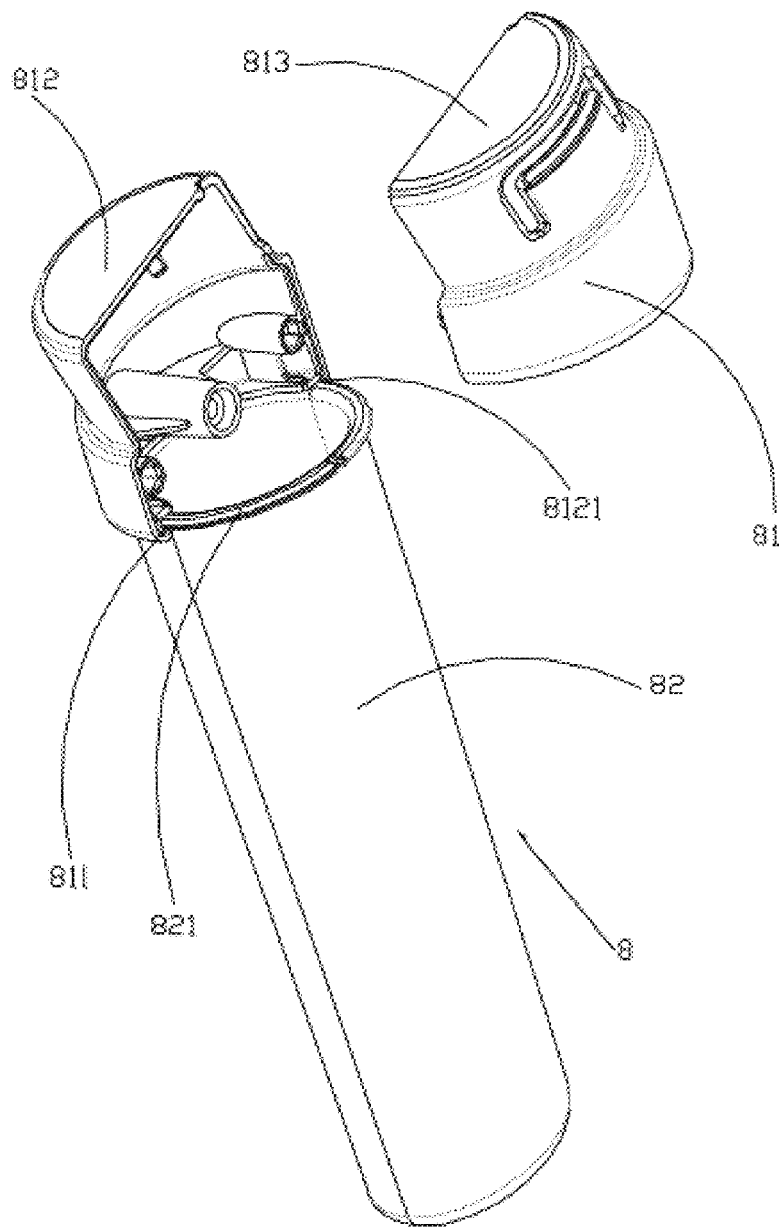
FIG. 22 is an exploded view of a support foot.
Figure 23:
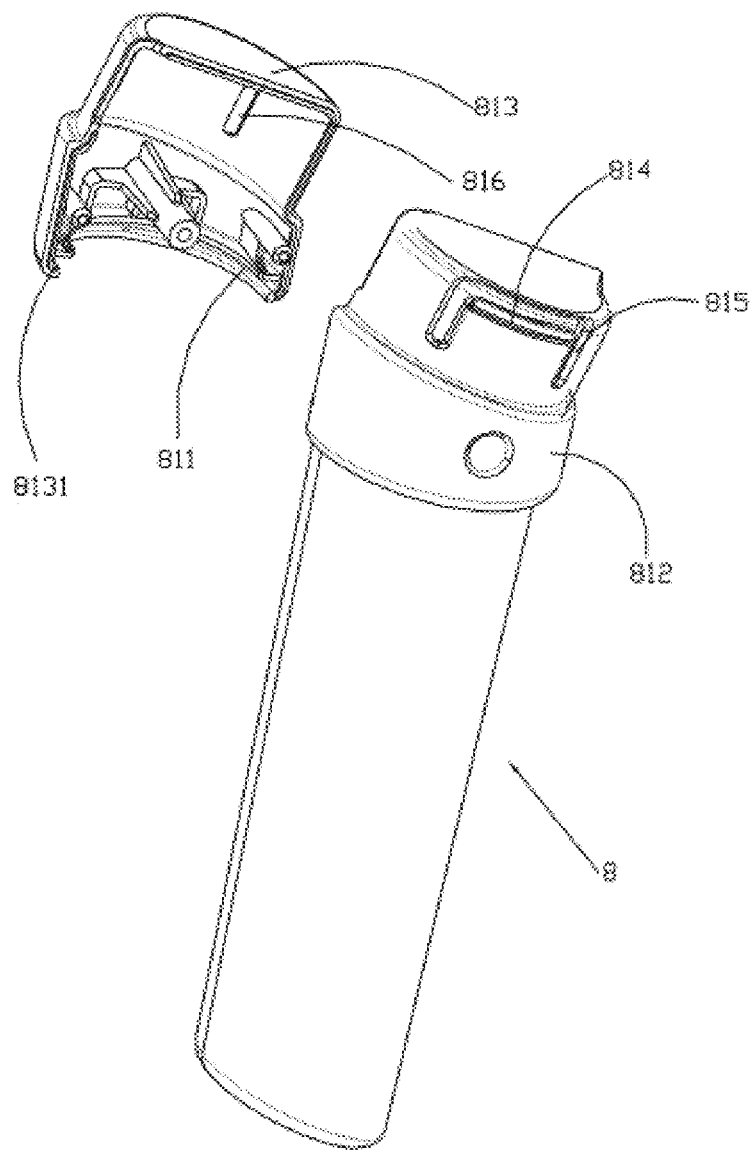
FIG. 23 is another exploded view of a support foot.
Figure 24:
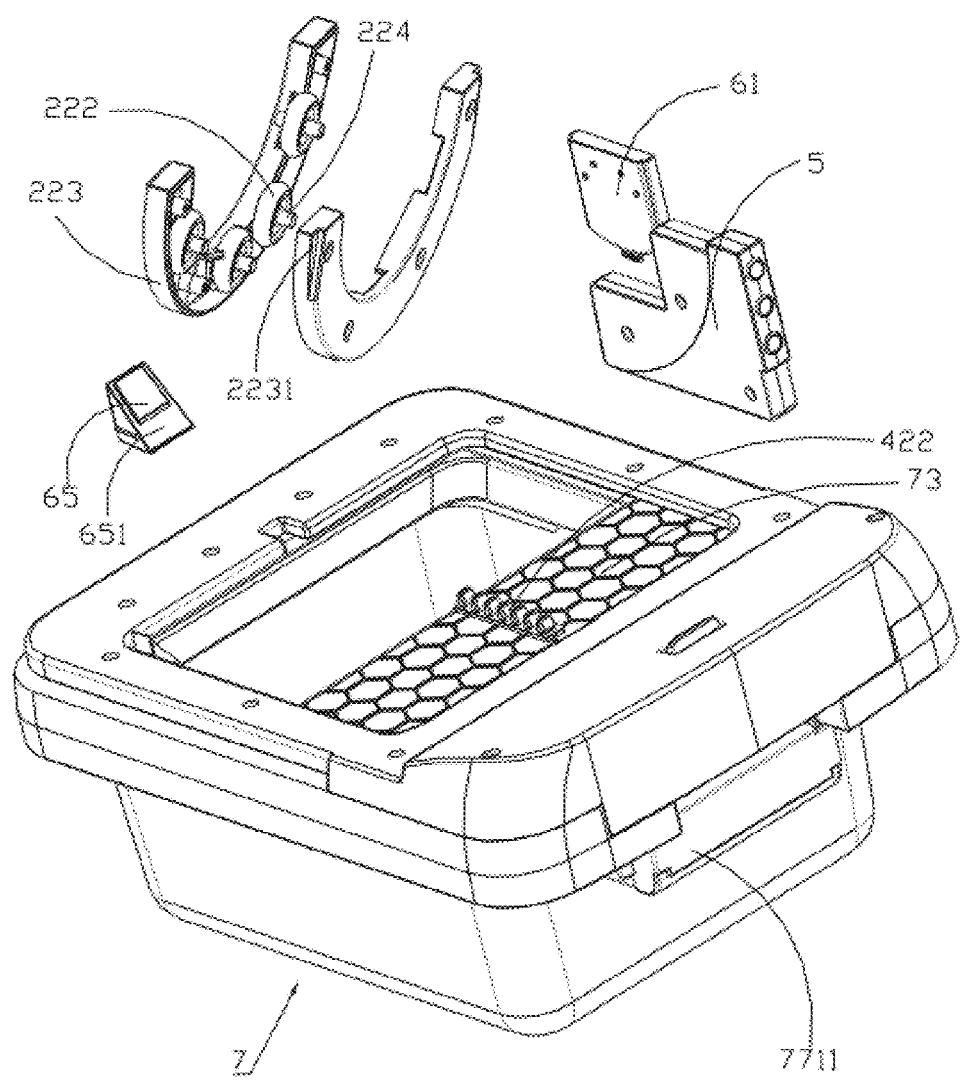
FIG. 24 is a schematic diagram of a structure of an excreta collecting box.
Figure 25:
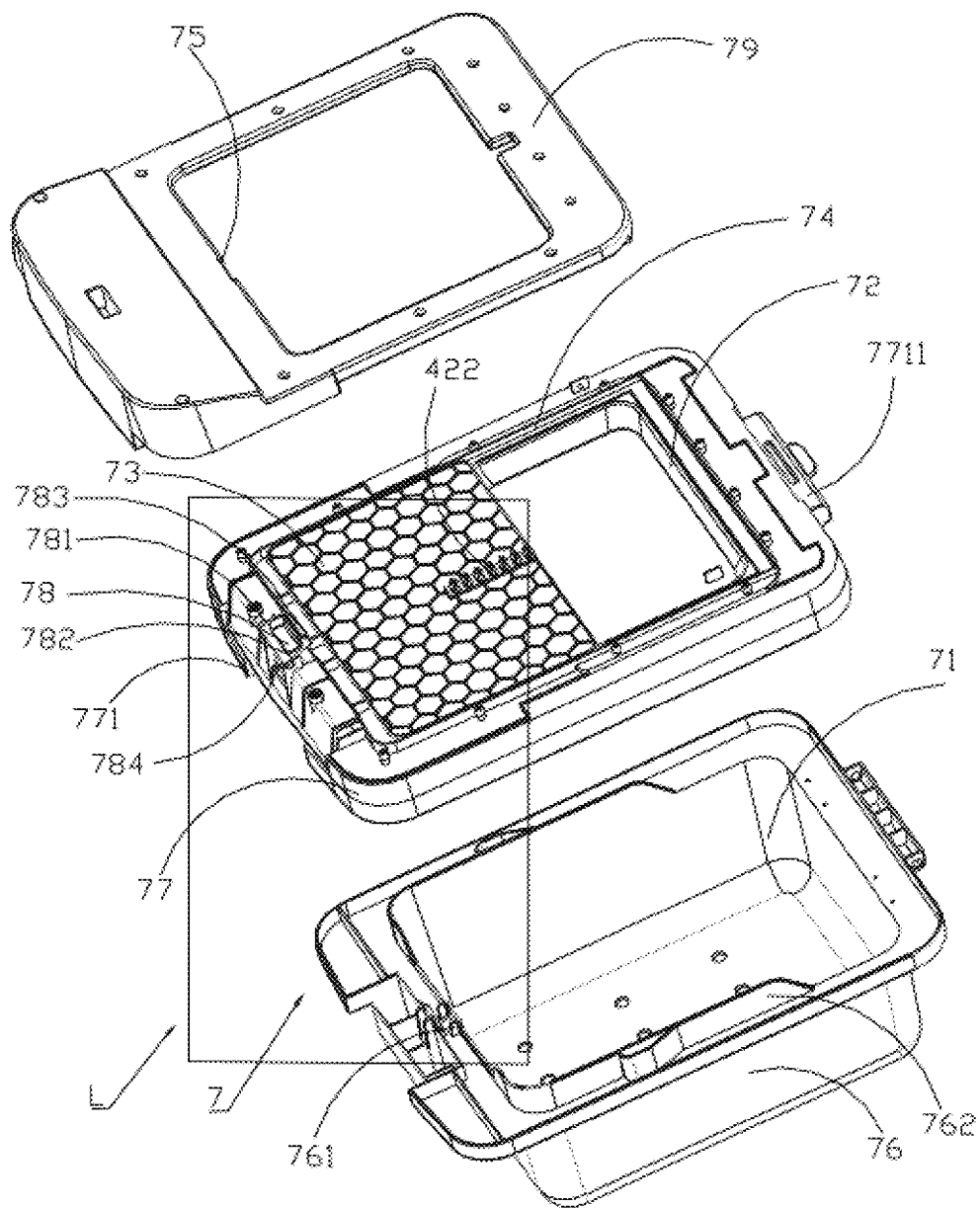
FIG. 25 is an exploded view of an excreta collecting box.
Figure 26:
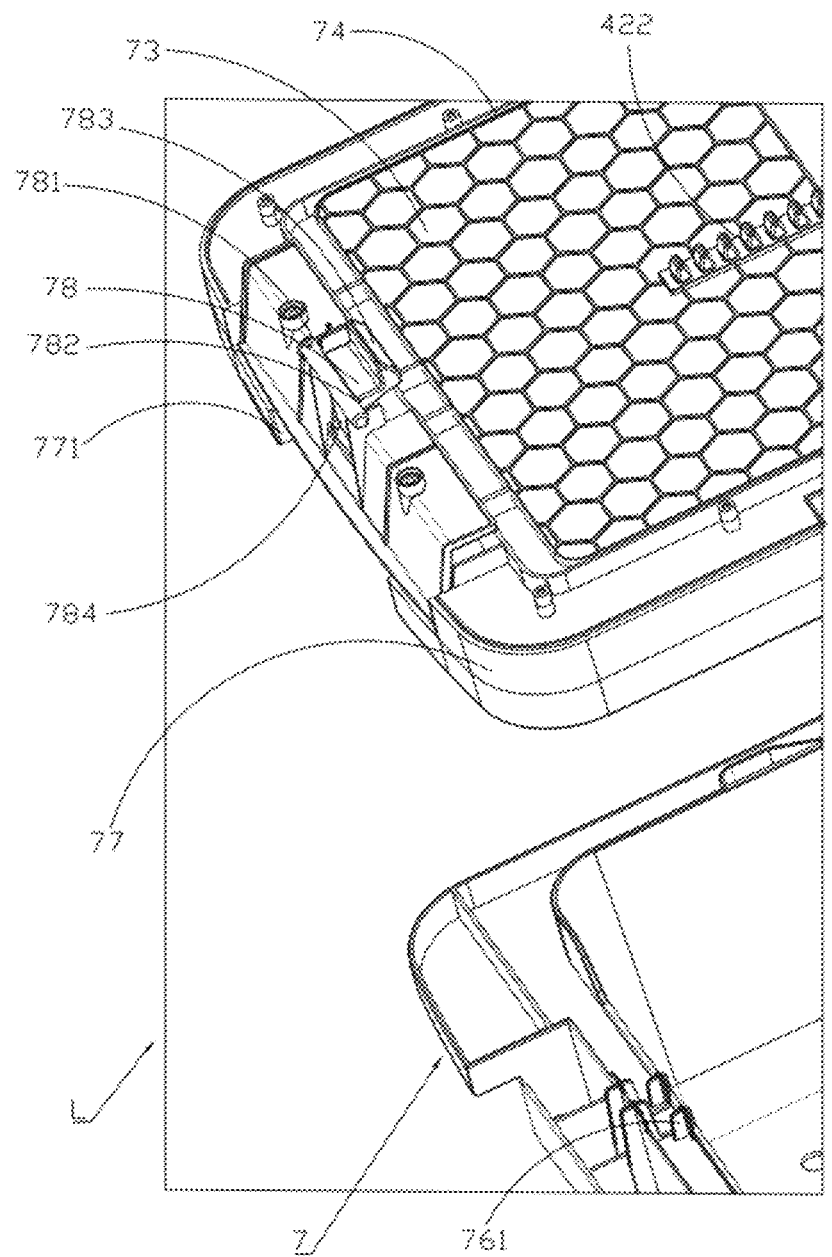
FIG. 26 is an enlarged view of area L in FIG. 25.
Figure 27:
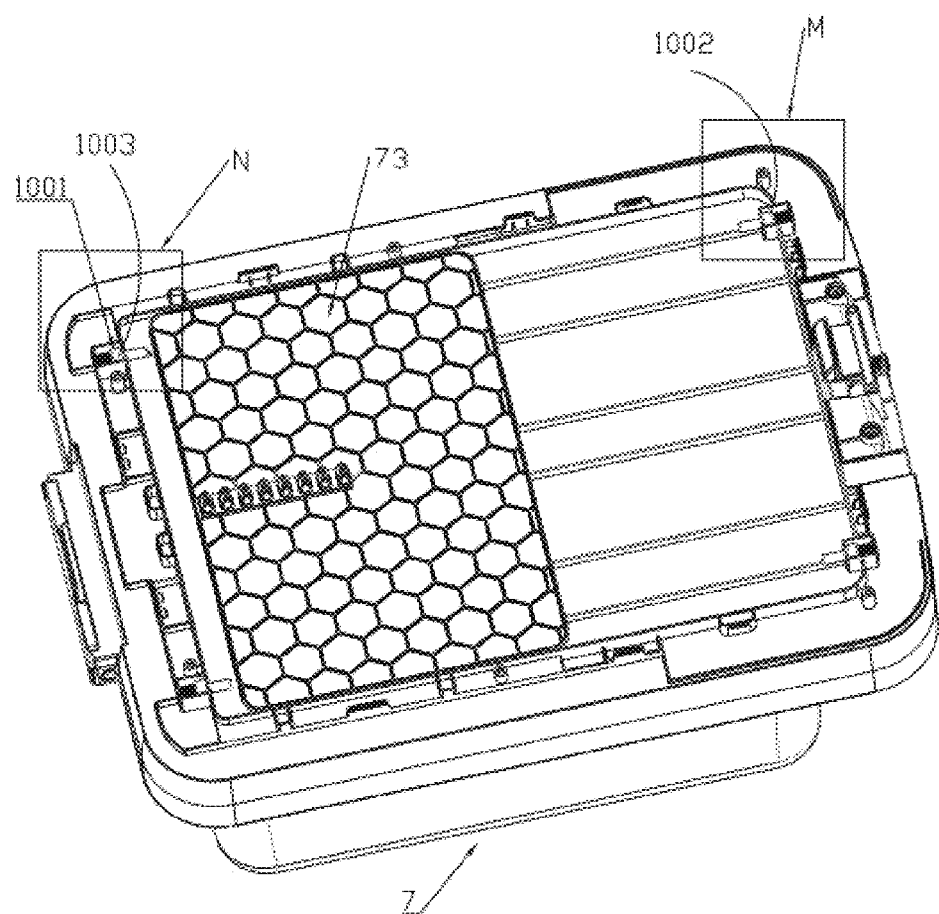
FIG. 27 is a schematic diagram of a structure of an elastic reset device.
Figure 28:
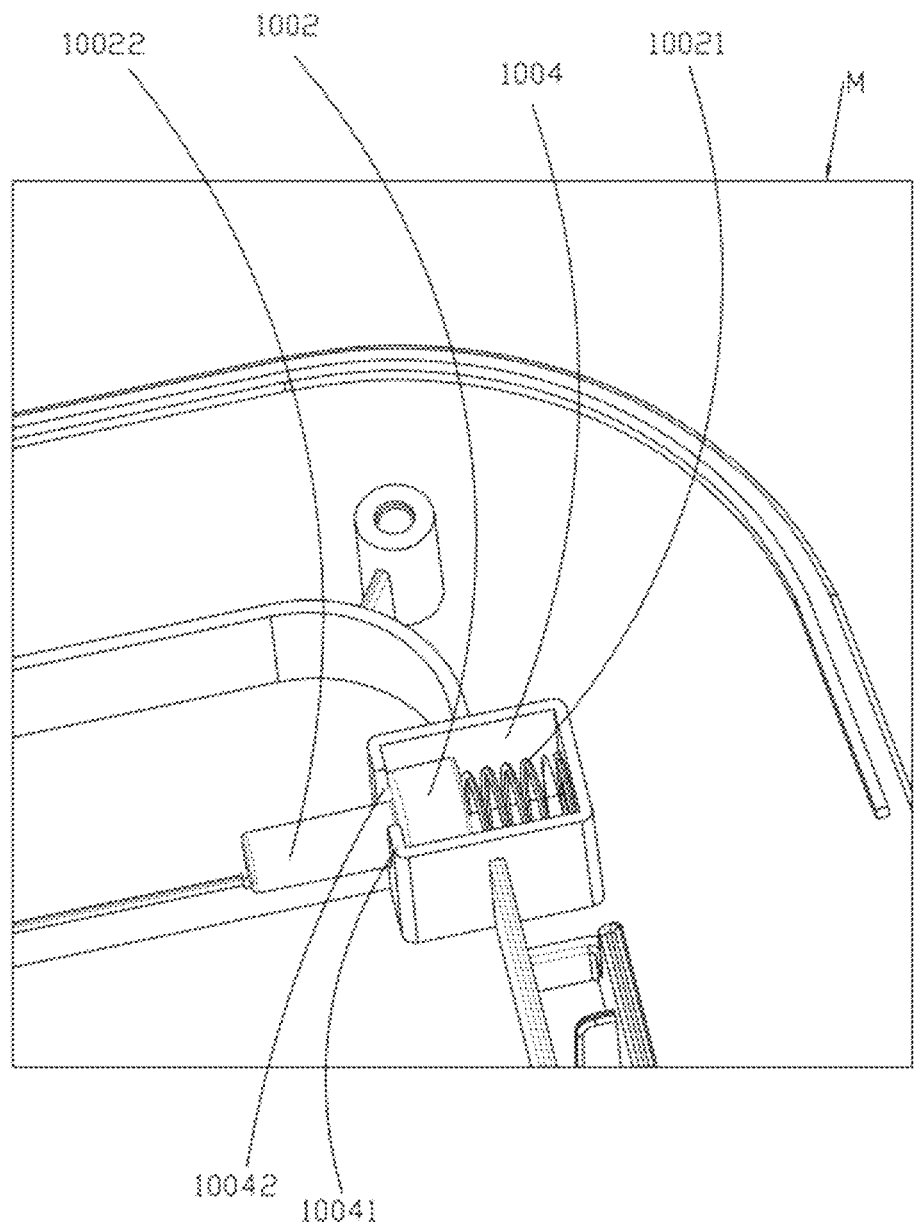
FIG. 28 is an enlarged view of area M in FIG. 27.
Figure 29:
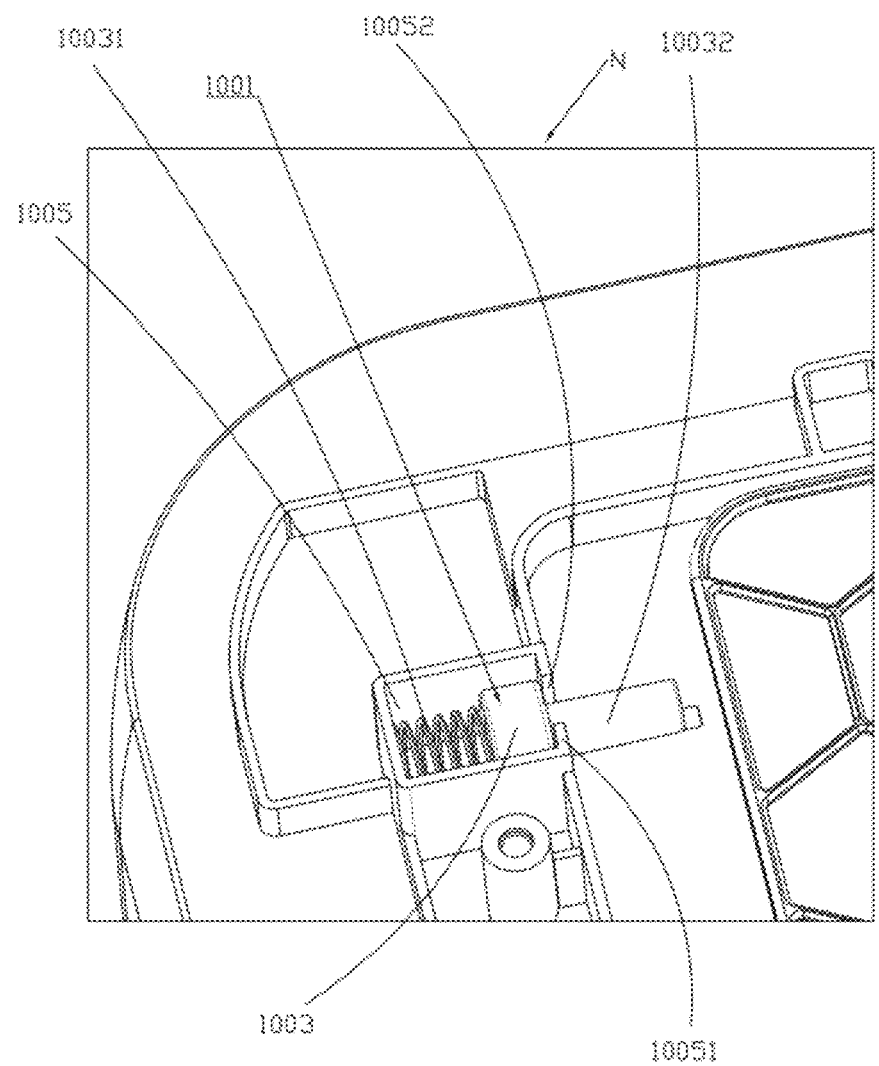
FIG. 29 is an enlarged view of area N in FIG. 27.
Figure 30:
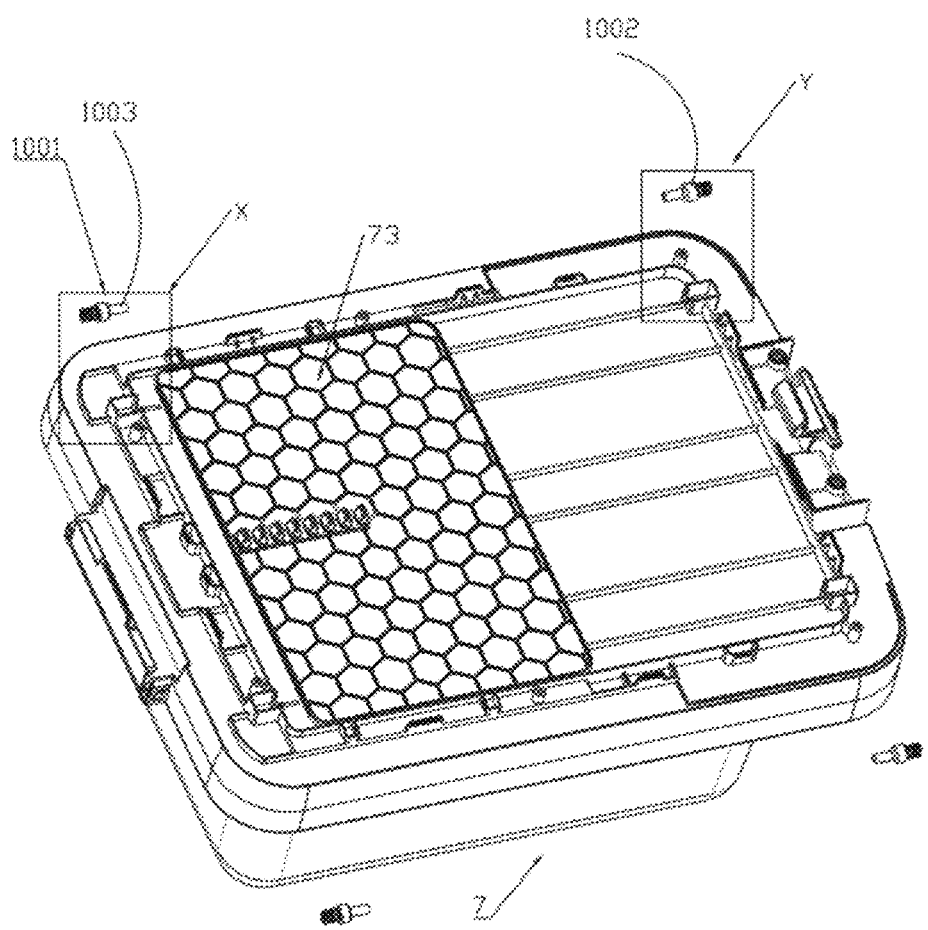
FIG. 30 is an exploded view of an elastic reset device.
Figure 31:
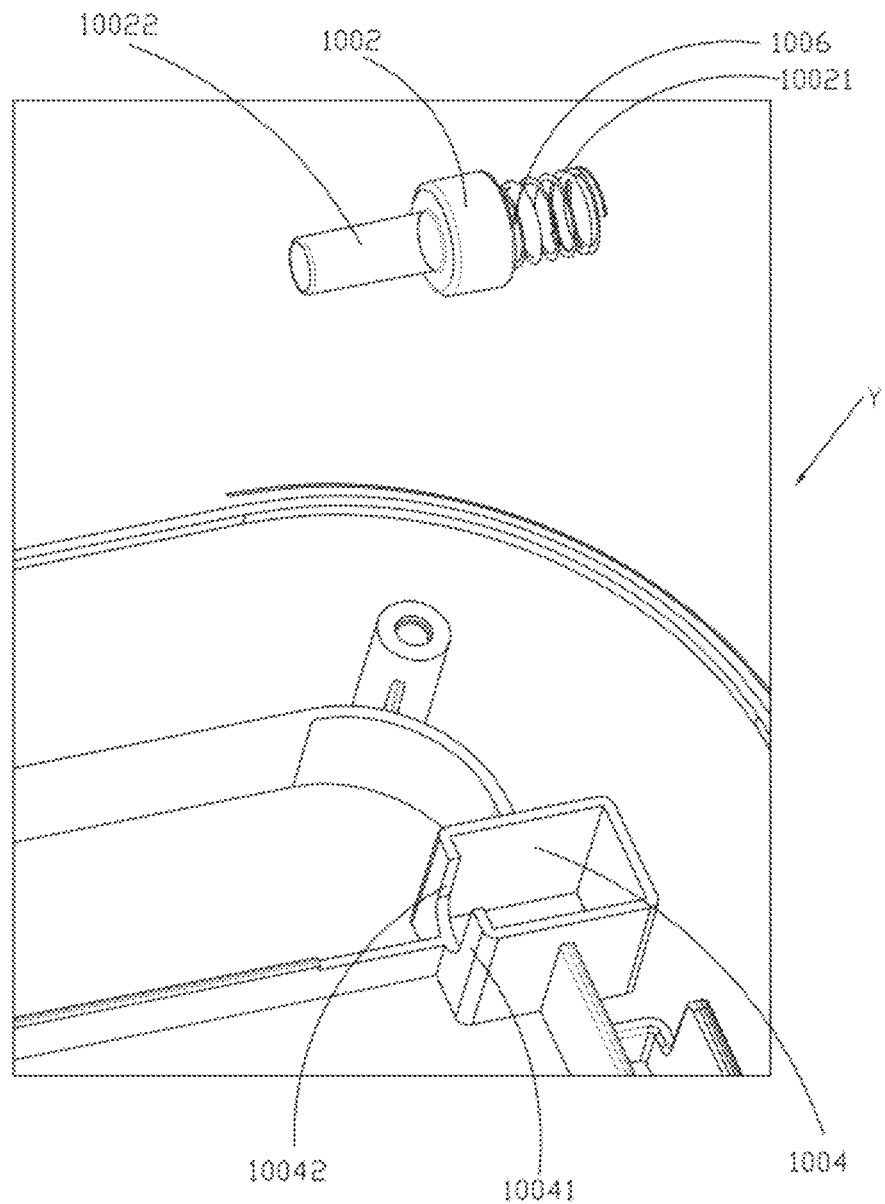
FIG. 31 is an enlarged view of area Y in FIG. 30.
Figure 32:
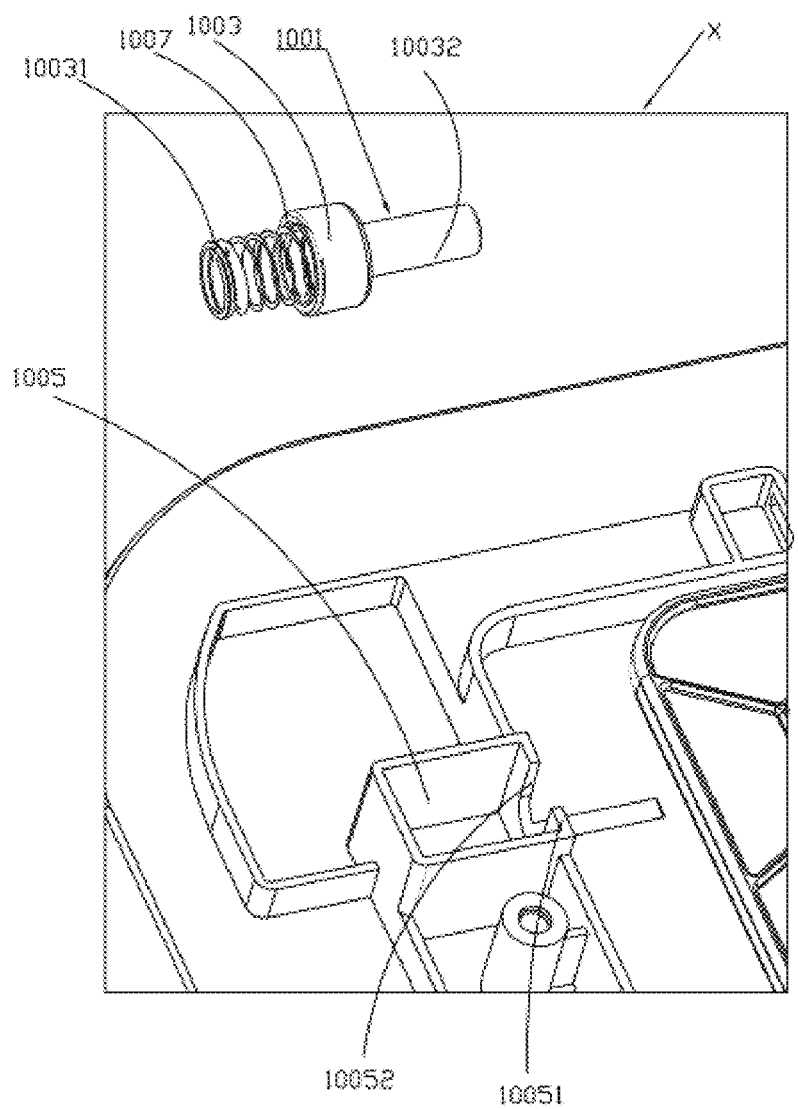
FIG. 32 is an enlarged view of area X in FIG. 30.
Figure 33:
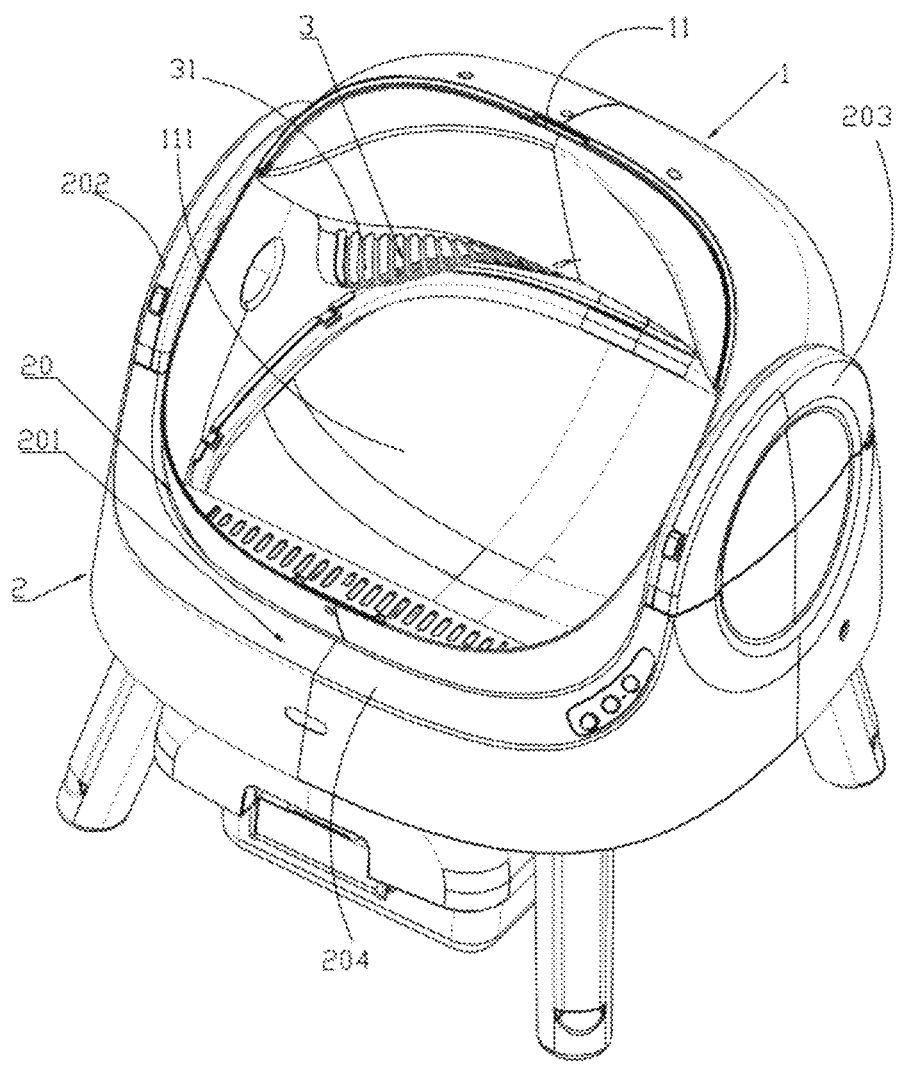
FIG. 33 is a schematic diagram of a structure of a proximity sensor switch, a rotary drum, and a base.
Figure 34:
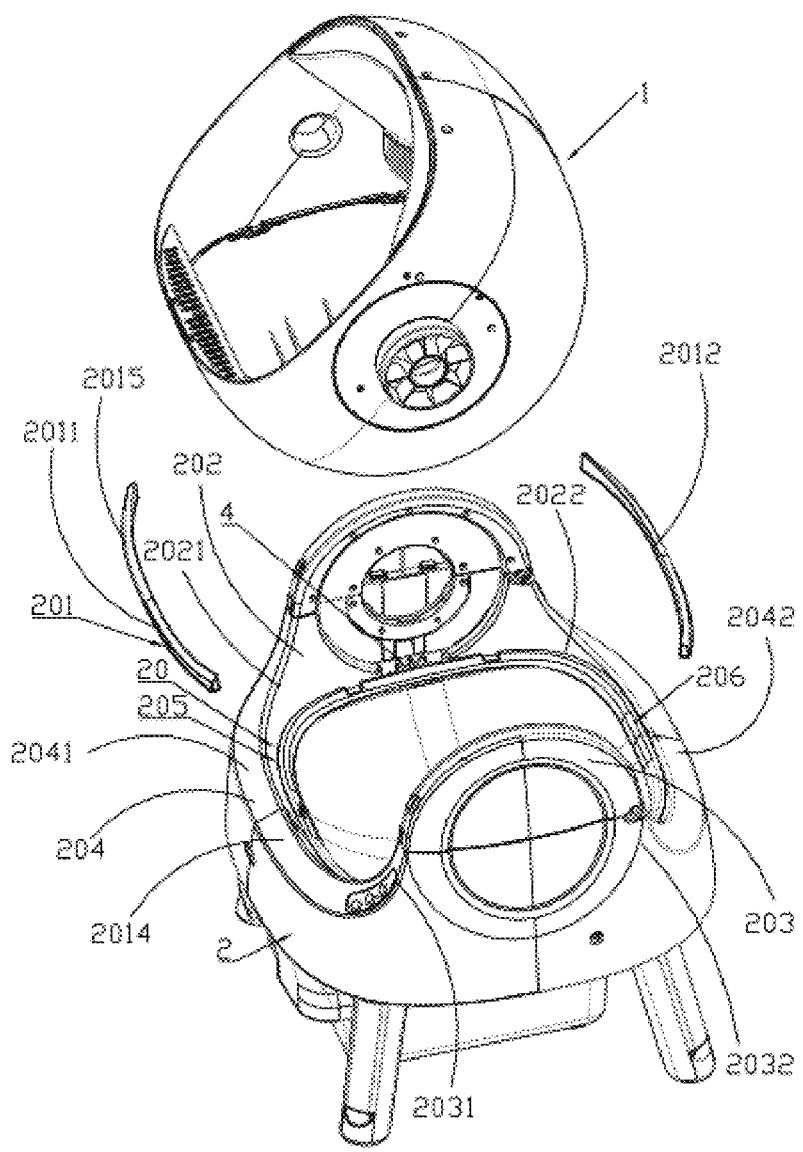
FIG. 34 is an exploded view of a proximity sensor switch, a rotary drum, and a base.
Figure 35:
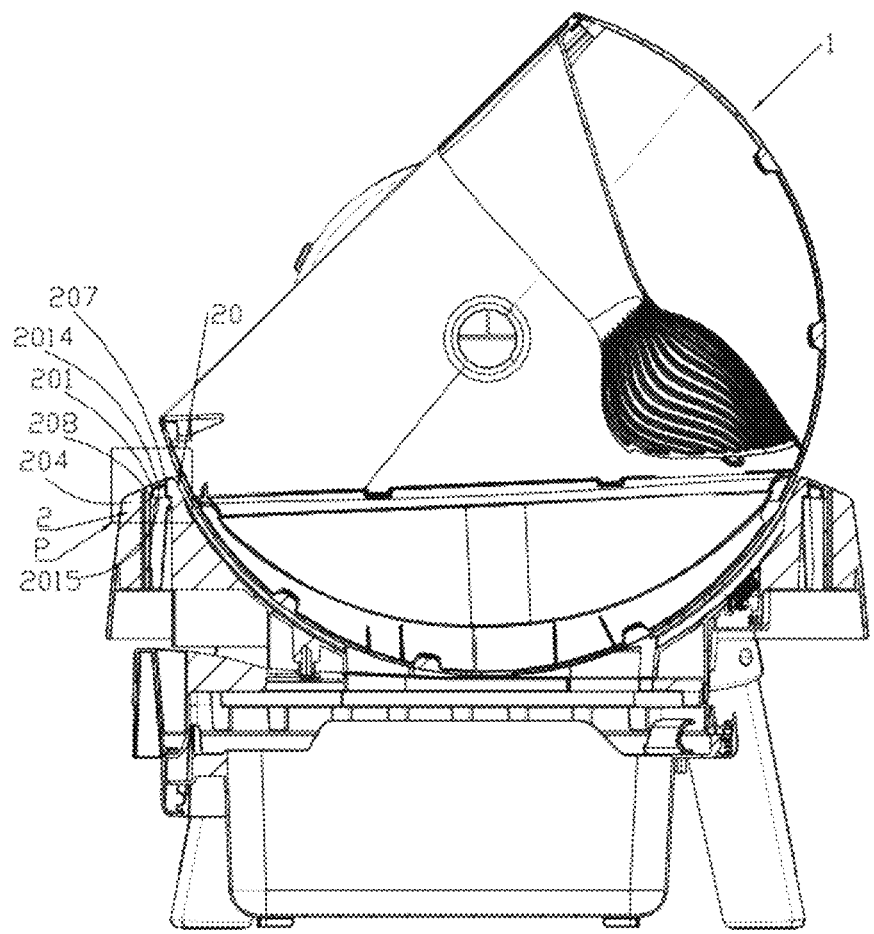
FIG. 35 is a sectional view cut along a proximity sensor switch, a rotary drum and a base.
Figure 36:
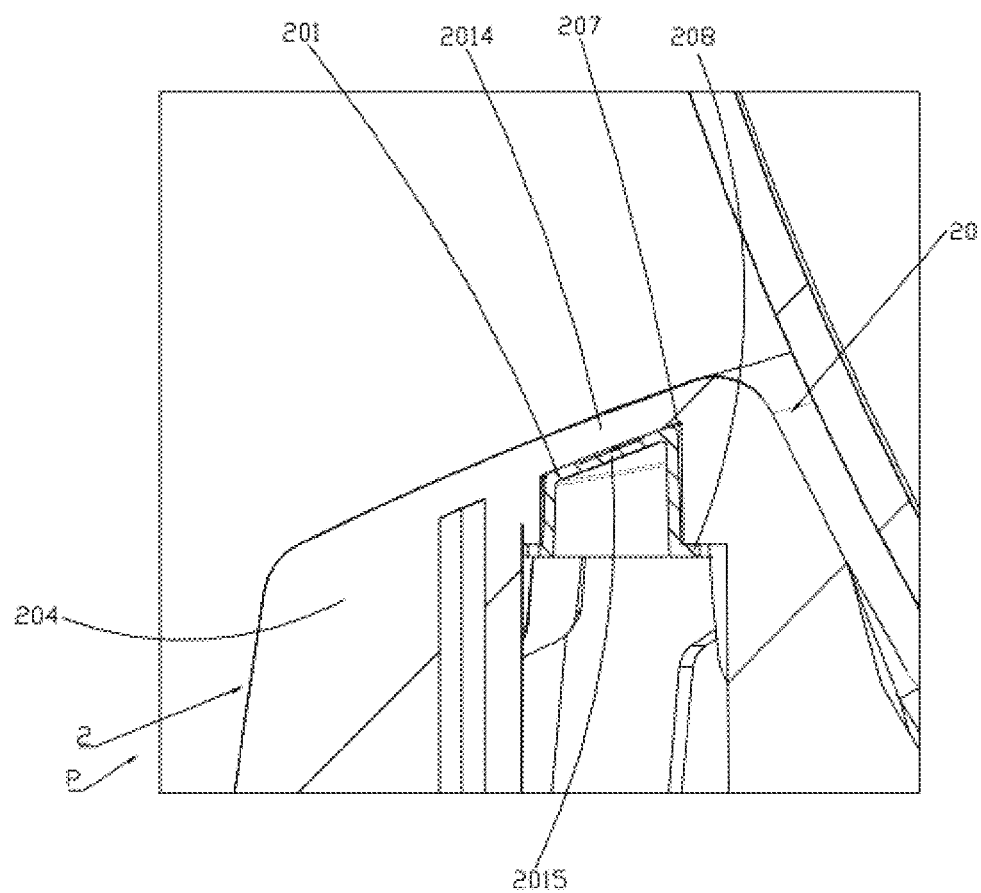
FIG. 36 is an enlarged view of area P in FIG. 35.

Referring to FIGS. 1 to 36, a pet toilet includes a rotary drum 1, a base 2, a sieve component 3, a drive device 4 and a proximity sensor switch 201.

The rotary drum 1 is equipped with a first opening 11 and a first accommodating space 111. The first opening 11 is in communication with the first accommodating space 111. The first accommodating space 111 is configured to accommodate pet excreta and pet litter.

The rotary drum 1 is supported by the base 2. A gap portion 20 is disposed between the base 2 and the rotary drum 1.

The sieve component 3 is connected to the rotary drum 1. The sieve component 3 and an inner wall of the rotary drum 1 together surround to form a third accommodating space 31, the third accommodating space 31 is adjacent to the first accommodating space 111, and the sieve component 3 is configured to sieve the pet litter and the excreta.

The drive device 4 is configured to drive the rotary drum 1 to rotate on a first support arm 22 and a second support arm 23. When the first opening 11 rotates with the rotary drum 1 from an initial position to a discharge position, the pet litter can enter the third accommodating space 31 through the sieve component 3, and the excreta is limited outside the third accommodating space 31, so that the excreta can be discharged through the first opening 11 via the excreta's own gravity. When the first opening 11 rotates towards the initial position with the rotary drum 1 from the discharge position, the pet litter in the third accommodating space 31 can pass through the sieve component 3 and fall back into the first accommodating space 111 via the pet litter's own gravity.

The proximity sensor switch 201 is disposed on the base 2. The proximity sensor switch 201 is arranged around the gap portion 20. The proximity sensor switch 201 is electrically connected to the drive device 4. When the proximity sensor switch 201 is triggered, the drive device 4 stops operating.

Through the above structure, when the rotary drum 1 rotates from the initial position to the discharge position, the pet litter can enter the third accommodating space 31 through the sieve component 3, and the excreta is limited outside the third accommodating space 31 to achieve the sieving of the pet litter and the pet excreta. The excreta can be discharged through the first opening 11 via the excreta's own gravity, completing separation and collection of the excreta. After the excreta is discharged, when the rotary drum 1 rotates towards the initial position from the discharge position, the pet litter in the third accommodating space 31 can pass through the sieve component 3 and fall back into the first accommodating space 111 via the pet litter's own gravity. Moreover, since the rotary drum 1 is supported by the base 2, the rotary drum 1 is capable of rotating more smoothly. Moreover, since the proximity sensor switch 201 is disposed on the base 2 and is arranged around the gap portion 20, and the proximity sensor switch 201 is electrically connected to the drive device 4, when the proximity sensor switch 201 is triggered, the drive device 4 stops operating. Thus, when a pet approaches the gap portion 20, the proximity sensor switch 201 will be triggered first, and the drive device 4 will stop operating, thereby preventing the pet's claws or body parts from being pinched and injured by being caught in the gap portion 20.

In this embodiment, the base 2 includes a left side wall 202, a right side wall 203, and a connecting wall 204 connecting the left side wall 202 and the right side wall 203. One end of the rotary drum 1 is supported by the left side wall 202, and the other end of the rotary drum 1 is supported by the right side wall 203. The gap portion 20 is located between the connecting wall 204 and the rotary drum 1, and the proximity sensor switch 201 is disposed on the connecting wall 204. Furthermore, the proximity sensor switch 201 includes a first proximity sensing unit 2011 and a second proximity sensing unit 2012. The connecting wall 204 includes a first connecting unit 2041 and a second connecting unit 2042. The left side wall 202 has a first end 2021 and a second end 2022 opposite to the first end 2021. The right side wall 203 has a third end 2031 and a fourth end 2032 opposite to the third end 2031. The first end 2021 and the third end 2031 are connected by the first connecting unit 2041, and the second end 2022 and the fourth end 2032 are connected by the second connecting unit 2042. The gap portion 20 includes a first gap 205 and a second gap 206. The first gap 205 is located between the first connecting unit 2041 and the rotary drum 1, and the second gap 206 is located between the second connecting unit 2042 and the rotary drum 1. The first proximity sensing unit 2011 is disposed on the first connecting unit 2041, and the second proximity sensing unit 2012 is disposed on the second connecting unit 2042. The first proximity sensing unit 2011 is arranged around the first gap 205, and the second proximity sensing unit 2012 is arranged around the second gap 206. Specifically, the proximity sensor switch 201 is a capacitive proximity sensor switch. Through the above structure, the first proximity sensing unit 2011 is disposed at the first gap 205 between the front side of the rotary drum 1 and the base 2, and the second proximity sensing unit 2012 is disposed at the second gap 206 between the rear side of the rotary drum 1 and the base 2. Thus, when a pet passes by the first connecting unit 2041 on the front side of the rotary drum 1, the first proximity sensing unit 2011 is triggered, and the drive device 4 stops operating, so that the rotary drum 1 stops rotating, preventing the pet's claws from being pinched and injured by being caught in the first gap 205. Moreover, when a pet passes by the second connecting unit 2042 on the rear side of the rotary drum 1, the second proximity sensing unit 2012 is triggered, and the drive device 4 stops operating, so that the rotary drum 1 stops rotating, preventing the pet's claws from being pinched and injured by being caught in the second gap 206. This greatly improves the safety of the pet toilet.

In this embodiment, the proximity sensor switch 201 includes a capacitive sensing plate 2015 and a proximity sensing area 2014. The proximity sensing area 2014 is disposed on the connecting wall 204, and the capacitive sensing plate 2015 is located below the proximity sensing area 2014. The capacitive sensing plate 2015 is a PCB board with its surface covered by a metallic conductor. Specifically, the metallic conductor is a copper sheet, and it may also be other metallic conductors. The detection distance of the capacitive sensing plate 2015 ranges from 0 to 5 cm. Further, the base 2 is provided with a switch installation slot 207, and the proximity sensor switch 201 is disposed within the switch installation slot 207. Furthermore, an upper side of the proximity sensor switch 201 is located within the switch installation slot 207. A lower side of the proximity sensor switch 201 is provided with a raised stop edge 208, and the stop edge 208 is configured to keep the lower side of the proximity sensor switch 201 outside the switch installation slot 207. Through the above structure, the installation of the proximity sensor switch 201 is effectively realized. When a pet is within the proximity sensing area 2014, the capacitance of the capacitive sensing plate 2015 changes, so as to determine whether a pet is approaching the gap portion 20, thereby preventing the pet's claws or body parts from being pinched and injured by being caught in the gap portion 20.

Embodiment II

Referring to FIGS. 1 to 26, a pet toilet includes a rotary drum 1, a base 2, a sieve component 3 and a drive device 4.

The rotary drum 1 is equipped with a first opening 11 and a first accommodating space 111. The first opening 11 is in communication with the first accommodating space 111. The first accommodating space 111 is used for accommodating pet excreta and pet litter.

The rotary drum 1 is supported on the base 2. The base 2 includes a main body 21, a first support arm 22, and a second support arm 23. The first support arm 22 is connected to one side of the main body 21, and the second support arm 23 is used for supporting the other side of the rotary drum 1. The first support arm 22 is used for supporting one side of the rotary drum 1, and the first support arm 22 is integrally formed with the main body 21. The second support arm 23 is used for supporting the other side of the rotary drum 1, and the second support arm 23 is integrally formed with the main body 21.

The sieve component 3 is connected to the rotary drum 1. The sieve component 3 and an inner wall of the rotary drum 1 together surround to form a third accommodating space 31. The third accommodating space 31 is adjacent to the first accommodating space 111. The sieve component 3 is used for sieving the pet litter and the excreta.

The drive device 4 is used for driving the rotary drum 1 to rotate on the first support arm 22 and the second support arm 23. When the first opening 11 rotates with the rotary drum 1 from an initial position to a discharge position, the pet litter can enter the third accommodating space 31 through the sieve component 3, and the excreta is limited outside the third accommodating space 31 to allow the excreta to be discharged through the first opening 11 via the excreta's own gravity. When the first opening 11 rotates towards the initial position with the rotary drum 1 from the discharge position, the pet litter in the third accommodating space 31 can pass through the sieve component 3 and fall back into the first accommodating space 111 via the pet litter's own gravity.

Through the above structure, when the rotary drum 1 rotates from the initial position to the discharge position, the pet litter can enter the third accommodating space 31 through the sieve component 3, and the excreta is limited outside the third accommodating space 31 to achieve the sieving of the pet litter and the pet excreta. The excreta can be discharged through the first opening 11 via the excreta's own gravity, completing separation and collection of the excreta. After the excreta is discharged, when the rotary drum 1 rotates towards the initial position from the discharge position, the pet litter in the third accommodating space 31 can pass through the sieve component 3 and fall back into the first accommodating space 111 via the pet litter's own gravity. Moreover, since the rotary drum 1 is supported by the first support arm 22 and the second support arm 23, the rotary drum 1 is capable of rotating more smoothly. Moreover, the first support arm 22 and the second support arm 23 are integrated with the main body 21, thereby greatly improving stability of the base 2, enhancing strength of the base 2, facilitating production, reducing installation steps, greatly improving production efficiency, and reducing production costs.

In this embodiment, the first support arm 22 is provided with a first support groove 221. The second support arm 23 is provided with a second support groove 231. One side of the rotary drum 1 is provided with a first support shaft 12, and the other side of the rotary drum 1 is provided with a second support shaft 13. The first support shaft 12 is located within the first support groove 221, and the first support shaft 12 is rotatable within the first support groove 221. The second support shaft 13 is located within the second support groove 231, and the second support shaft 13 is rotatable within the second support groove 231. The first support groove 221 is equipped with a plurality of first rollers 222. The first rollers 222 are supported by the first support shaft 12. Through the above structure, when the first support shaft 12 rotates in the first support groove 221, the first support shaft 12 supports the first rollers 222, so that the rotary drum 1 rotates on the first support arm 22 of the base 2 through the first support shaft 12, effectively improving transmission efficiency. Moreover, a weight of the rotary drum 1 is concentrated on the support arms on both sides of the main body 21, which can prevent the weight of the rotary drum 1 from concentrating on the main body 21 and prevent deformation and damage of the main body 21.

In this embodiment, a roller carrier 223 is provided inside the first support groove 221, and the first rollers 222 are rotatably located on the roller carrier 223. The first rollers 222 are rotatably connected to the roller carrier 223 through a first rotation shaft 224. Specifically, the roller carrier 223 is in an arc shape. A lower surface of the roller carrier 223 abuts against the first support groove 221, and the plurality of first rollers 222 are arranged uniformly along an upper surface of the roller carrier 223. Furthermore, a lower surface of the roller carrier 223 is provided with a first positioning groove 2231. The first support groove 221 is internally provided with a first positioning protrusion 2211. The first positioning groove 2231 is connected to the first positioning protrusion 2211. Furthermore, a first annular groove 121 is provided on the first support shaft 12, and the first rollers 222 are rotatable within the first annular groove 121. Furthermore, a second annular groove 131 is provided on the second support shaft 13, and a first annular protrusion 2311 is provided within the second support groove 231. The first annular protrusion 2311 is rotatably connected to the second annular groove 131. Through the above structure, a setting of the first rollers 222 has been effectively achieved, and the first rollers 222 can be easily replaced, disassembled, and cleaned through the roller carrier 223. Moreover, since the first rollers 222 rotate in the first annular groove 121, a position of the first rollers 222 can be prevented from shifting, improving operation stability of the first rollers 222, so as to enable the first support shaft 12 to rotate stably in the first support groove 221. Furthermore, the first annular protrusion 2311 is rotatably connected to the second annular groove 131 to enable the second support shaft 13 to rotate stably within the second support groove 231.

In this embodiment, the main body 21 of the base 2 is further equipped with a concave part 24, and the concave part 24 is concave in a direction away from the rotary drum 1. A second roller 241 is provided on the concave part 24. When the rotary drum 1 is supported on the base 2, the second roller 241 is supported on an outer side wall of the rotary drum 1. The second roller 241 inside the concave part 24 is capable of assisting the rotary drum 1 in rotating, allowing the rotary drum 1 to rotate more smoothly on the support arms of the base 2. The second roller 241 is rotatably connected to the main body 21 through a second rotation shaft 242.

In this embodiment, the pet toilet further includes a first flip cover 25 and a second flip cover 26. One end of the first flip cover 25 is rotatably connected to one side of the first support arm 22, and the other end of the first flip cover 25 is detachably connected to the other side of the first support arm 22. The first flip cover 25 covers the first support groove 221 to keep the first support shaft 12 in the first support groove 221. One end of the second flip cover 26 is rotatably connected to one side of the second support arm 23, and the other end of the second flip cover 26 is detachably connected to the other side of the second support arm 23. The second flip cover 26 covers the second support groove 231 to keep the second support shaft 13 in the second support groove 231. Through the above structure, since the first flip cover 25 covers the first support groove 221 to keep the first support shaft 12 in the first support groove 221, and the second flip cover 26 covers the second support groove 231 to keep the second support shaft 13 in the second support groove 231, so as to prevent the first support shaft 12 from detaching from the first support groove 221 during rotation and to prevent the second support shaft 13 from detaching from the second support groove 231 during rotation, thereby making the rotary drum 1 rotate more smoothly on the base 2. Moreover, since one end of the first flip cover 25 is rotatably connected to one side of the first support arm 22, the other end of the first flip cover 25 is detachably connected to the other side of the first support arm 22, one end of the second flip cover 26 is rotatably connected to one side of the second support arm 23, and the other end of the second flip cover 26 is detachably connected to the other side of the second support arm 23, it is convenient for a user to open or close the first flip cover 25 and the second flip cover 26, facilitating the user to install or remove the rotary drum 1 from the first support arm 22 or the second support arm 23.

In this embodiment, the pet toilet further includes a first locking member 251 and a second locking member 261. The first flip cover 25 is detachably connected to the first support arm 22 through the first locking member 251, and the second flip cover 26 is detachably connected to the second support arm 23 through the second locking member 261. The first locking member 251 includes a first locking buckle 252, a first elastic member 253, and a first locking hole 254 provided on the first support arm 22. The first locking buckle 252 includes a first connecting end 2521, a first locking hook end 2522, and a first pushing end 2523. The first connecting end 2521 is provided between the first locking hook end 2522 and the first pushing end 2523. The first connecting end 2521 is rotatably connected to the first flip cover 25. The first elastic member 253 is connected to the first locking buckle 252, so as to push and lock the first locking hook end 2522 of the first locking buckle 252 to the first locking hole 254. Under an action of external force, the first pushing end 2523 is capable of pushing the first locking hook end 2522 to rotate and detach from the first locking hole 254. The second locking member 261 includes a second locking buckle 262, a second elastic member 263, and a second locking hole 264 provided on the second support arm 23. The second locking buckle 262 includes a second connecting end 2621, a second locking hook end 2622, and a second pushing end 2623. The second connecting end 2621 is provided between the second locking hook end 2622 and the second pushing end 2623. The second connecting end 2621 is rotatably connected to the second flip cover 26. The second elastic member 263 is connected to the second locking buckle 262, so as to push and lock the second locking hook end 2622 of the second locking buckle 262 to the second locking hole 264. Under the action of external force, the second pushing end 2623 is capable of pushing the second locking hook end 2622 to rotate and detach from the second locking hole 264. Through the above structure, a detachable connection between the first flip cover 25 and the first support arm 22 is effectively achieved. Moreover, a detachable connection between the second flip cover 26 and the second support arm 23 is effectively achieved. Therefore, by pushing the first pushing end 2523 to push the first locking hook end 2522 to rotate and detach from the first locking hole 254, pushing the second pushing end 2623 to push the second locking hook end 2622 to rotate and detach from the second locking hole 264, the flip covers can be opened, facilitating the user to install and remove the rotary drum 1.

In this embodiment, the pet toilet further includes a third roller 255 and a third shaft 256. The first flip cover 25 includes a first housing unit 257 and a second housing unit 258. The first housing unit 257 is detachably connected to the second housing unit 258. The first housing unit 257 is provided with a first installation shaft hole 2571. The second housing unit 258 is provided with a second installation shaft hole 2581. The third roller 255 rotatably sleeves the first shaft 224. One end of the third shaft 256 is inserted into the first installation shaft hole 2571, and the other end of the third shaft 256 is inserted into the second installation shaft hole 2581. The third roller 255 abuts against the first support shaft 12 and is rotatable within the first annular groove 121. The second flip cover 26 includes a third housing unit 265 and a fourth housing unit 266. The third housing unit 265 is detachably connected to the fourth housing unit 266. A second annular protrusion 2661 is provided on the third housing unit 265 or the fourth housing unit 266. The second annular protrusion 2661 is rotatably connected to the second annular groove 131. Through the above structure, the third roller 255 is capable of reducing a friction force between the first support shaft 12 and the flip cover, making rotation of the first support shaft 12 smoother, so that the rotary drum 1 can rotate more smoothly.

In this embodiment, the first flip cover 25 is further equipped with a first stop groove 259. The second flip cover 26 is further equipped with a second stop groove 267. The first stop groove 259 covers an upper half of the first support shaft 12, and the first support groove 221 supports a lower half of the first support shaft 12. The second stop groove 267 covers an upper half of the second support shaft 13, and the second support groove 231 supports a lower half of the second support shaft 13. The third roller 255 is located inside the first stop groove 259, and the second annular protrusion 2661 is located inside the second stop groove 267. Through the above structure, the first flip cover 25 and the first support groove 221 completely cover the first support shaft 12, while the second flip cover 26 and the second support groove 231 completely cover the second support shaft 13, so as to prevent positional displacement of the first support shaft 12 and the second support shaft 13 during rotation.

In this embodiment, the pet toilet further includes a chassis 5 and a control motherboard 51. The control motherboard 51 is electrically connected to the drive device 4. The chassis 5 is equipped with a fifth accommodating space 52, and the fifth accommodating space 52 is formed by side walls of the chassis 5. The control motherboard 51 is located inside the chassis 5. The base 2 is equipped with a chassis insertion slot 53, and the chassis 5 is inserted into the chassis insertion slot 53. Through the above structure, the control motherboard 51 is installed inside the chassis 5, and then the chassis 5 is inserted into the chassis insertion slot 53, effectively realizing a modular disassembly and assembly of the control motherboard 51, making it convenient for the user to install, disassemble, replace, and repair the control motherboard 51.

In this embodiment, the chassis 5 is connected to the base 2 through a first connector. The first connector is a first screw. Fixing the chassis 5 in the chassis insertion slot 53 via the first connector can prevent the chassis 5 from loosening out of the chassis insertion slot 53.

In this embodiment, the pet toilet further includes an interface group 55. The interface group 55 includes a plurality of interfaces. The interface group 55 is electrically connected to the control motherboard 51. The chassis 5 is equipped with a plurality of first installation openings 56. The interface group 55 is electrically connected to the control motherboard 51. The interface group 55 is located inside the first installation opening 56, and a sealing element 58 is provided between the interface group 55 and an inner wall of the first installation opening 56. The pet toilet further includes a first infrared detection device 6. The first infrared detection device 6 is electrically connected to the control motherboard 51 via the interface group 55. The first infrared detection device 6 is connected to the rotary drum 1 or base 2. The first infrared detection device 6 is used for detecting whether a pet has entered the rotary drum 1. Specifically, the pet toilet further includes a Hall sensing device 61. The Hall sensing device 61 is electrically connected to the control motherboard 51 via the interface group 55. The Hall sensing device 61 is used for detecting a position of the rotation of the rotary drum 1. Furthermore, the Hall sensing device 61 includes a magnetic induction zone 611, a first magnetic pole 612, and a second magnetic pole 613. The magnetic induction zone 611 is located at the base 2. The first magnetic pole 612 and the second magnetic pole 613 are located at the rotary drum 1. When the rotary drum 1 rotates to the initial position, the first magnetic pole 612 is located in the magnetic induction zone 611. When the rotary drum 1 rotates to the discharge position, the second magnetic pole 613 is located in the magnetic induction zone 611. Furthermore, the interface group 55 includes at least a first infrared detection device interface 62, a Hall sensing device interface 621, and a power supply interface 622. The first infrared detection device interface 62 is electrically connected to the first infrared detection device 6. The Hall sensing device interface 621 is electrically connected to the Hall sensing device 61. The power supply interface 622 is used for powering the drive device 4.

Through the above structure, the first infrared detection device 6 is capable of retrieving whether the pet has entered the rotary drum 1. When the pet is detected to enter the toilet and leave the rotary drum 1, the control motherboard 51 is capable of controlling the rotary drum 1 to rotate from the initial position to the discharge position based on a signal from the first infrared detection device 6. When the magnetic induction zone 611 senses the second magnetic pole 613, the rotary drum 1 rotates to the discharge position, and the control motherboard 51 controls the rotary drum 1 to stop rotating based on a signal from the Hall sensing device 61, so as to discharge excreta into an excreta collecting box 7. After the excreta is discharged through the first opening 11, the control motherboard 51 controls the rotary drum 1 to rotate from the discharge position to the initial position. When the magnetic induction zone 611 senses the first magnetic pole 612, the rotary drum 1 rotates to the initial position, and the control motherboard 51 controls the rotary drum 1 to stop rotating based on the signal feedback from the Hall sensing device 61, so that the rotary drum 1 remains in the initial position for the pet to enter and exit the toilet. Furthermore, since the control motherboard 51 is located inside the chassis 5 and the chassis 5 is equipped with the first infrared detection device interface 62, the Hall sensing device interface 621 and the power supply interface 622, a modular design has been achieved to facilitate an installation of the control motherboard 51 with the first infrared detection device 6, the Hall sensing device 61, and the drive device 4. Moreover, due to the sealing element 58 installed between the interface group 55 and the inner wall of the first installation opening 56, liquid can be prevented from seeping into the chassis 5, so that the control motherboard 51 inside the chassis 5 can be prevented from being corroded by the liquid, and a short circuit of the control motherboard 51 caused by the liquid seeping into the chassis 5 can be prevented, thereby further improving a service life of the pet toilet. The chassis 5 is further equipped with a plurality of control buttons. The control buttons are electrically connected to the control motherboard 51 and the drive device 4 to control the rotation of the rotary drum 1. Through the above structure, the user can also manually control the rotation of the rotary drum 1 through the buttons.

In this embodiment, the first infrared detection device 6 includes a first infrared detection module 63 and a first installation box 631. The first infrared detection module 63 is located inside the first installation box 631, and the base 2 is provided with a first insertion slot 27. The first installation box 631 is inserted into the first insertion slot 27, and the first installation box 631 is connected to the base 2 through a second connector. The second connector is a second screw. Through the above structure, the modular design of the first infrared detection device 6 has been achieved, facilitating the installation of the first infrared detection device 6 by the user.

In this embodiment, a third opening 28 is also provided on the base 2. When the first opening 11 rotates with the rotary drum 1 from the initial position to the discharge position, the pet litter can enter the third accommodating space 31 through the sieve component 3, the excreta is limited outside the third accommodating space 31, and the first opening 11 rotates with the rotary drum 1 to align with the third opening 28, so that the excreta can be discharged through the first opening 11 and the third opening 28 through the excreta's own gravity. When the first opening 11 rotates towards the initial position with the rotary drum 1 from the discharge position, the first opening 11 and the third opening 28 are staggered, the pet litter in the third accommodating space 31 can pass through the sieve component 3 and fall back into the first accommodating space 111 by the pet litter's own gravity. The pet toilet further includes a second infrared detection device 64. The second infrared detection device 64 is connected to the base 2, and the second infrared detection device 64 is electrically connected to the control motherboard 51. The second infrared detection device 64 includes a first infrared emitting module 641 and a first infrared receiving module 642. The first infrared emitting module 641 and the first infrared receiving module 642 are respectively located on both sides of the third opening 28. When the rotary drum 1 rotates to the discharge position, the second infrared detection device 64 is used for detecting whether a pet has entered the third opening 28. Through the above structure, when the second infrared detection device 64 detects the pet at the third opening 28, the rotary drum 1 stops rotating to prevent the rotary drum 1 and the base from pinching the pet.

Specifically, the pet toilet further includes a third infrared detection device 65. The third infrared detection device 65 is a third infrared distance detection device. The third infrared detection device 65 is connected to the base 2, and the third infrared detection device 65 is electrically connected to the control motherboard 51. An emission end of the third infrared detection device 65 is facing above the third opening 28. When the rotary drum 1 rotates to the discharge position, the third infrared detection device 65 is used for detecting whether there is a pet above the third opening 28. Through the above structure, when the third infrared detection device 65 detects the pet above the third opening 28, the rotary drum 1 stops rotating to prevent the rotary drum 1 and the base from pinching the pet.

Furthermore, the second infrared detection device 64 and the third infrared detection device 65 start detection work when the rotary drum 1 rotates to the discharge position. When the rotary drum 1 rotates to block the second infrared detection device 64, the second infrared detection device 64 stops working. When the rotary drum 1 rotates to block the third infrared detection device 65, the third infrared detection device 65 stops working, so as to avoid false detection by the second infrared detection device 64 and the third infrared detection device 65.

Furthermore, the pet toilet further includes a second installation box 643, a third installation box 644, and a fourth installation box 651. The first infrared emitting module 641 is located inside the second installation box 643. The first infrared receiving module 642 is located inside the third installation box 644. The base 2 is further equipped with a second insertion slot 271, a third insertion slot 272, and a fourth insertion slot 273. The second installation box 643 is inserted inside the second insertion slot 271, and the second installation box 643 is connected to the base 2 through a third connector. The third installation box 644 is inserted into the third insertion slot 272, and the third installation box 644 is connected to the base 2 through a fourth connector. The third infrared detection device 65 is located inside the fourth installation box 651. The fourth installation box 651 is inserted into the fourth insertion slot 273, and the fourth installation box 651 is connected to the base 2 through a fifth connector. Through the above structure, the modular design of the first infrared detection device 6 and the second infrared detection device 64 has been achieved, facilitating the installation of the first infrared detection device 6 and the second infrared detection device 64 by the user.

In this embodiment, the pet toilet further includes an excreta collecting box 7, and the excreta collecting box 7 is located below the base 2. The excreta collecting box 7 is equipped with a second accommodating space 71 and a second opening 72, and the second opening 72 is in communication with the second accommodating space 71. The pet toilet further includes a sealing door 73, and the sealing door 73 is located at the second opening 72 to open or close the second opening 72. A first magnetic suction member 731 is installed on the sealing door 73, and a second magnetic suction member 732 is installed on the excreta collecting box 7. When the sealing door 73 covers the second opening 72, the first magnetic suction member 731 and the second magnetic suction member 732 are magnetically attracted to each other, so as to close the sealing door 73 to cover the second opening 72 via magnetic suction. When the first opening 11 rotates with the rotary drum 1 from the initial position to the discharge position, the pet litter can enter the third accommodating space 31 through the sieve component 3, the excreta is limited outside the third accommodating space 31, the drive device 4 drives the sealing door 73 to open the second opening 72, and the first opening 11 rotates with the rotary drum 1 to align with the third opening 28 and the second opening 72, so that the excreta can be discharged into the second accommodating space 71 through the first opening 11 and the second opening 72 via the excreta's own gravity. When the first opening 11 rotates with the rotary drum 1 towards the initial position from the discharge position, the first opening 11 is staggered from the second opening 72 and the third opening 28, the pet litter in the third accommodating space 31 can pass through the sieve component 3 and fall back into the first accommodating space 111 via the pet litter's own gravity, and the drive device 4 drives the sealing door 73 to close the second opening 72. Through the above structure, when the drive device 4 drives the sealing door 73 to close the second opening 72, the first magnetic suction member 731 and the second magnetic suction member 732 mutually attract each other, so as to close the sealing door 73 to cover the second opening 72 via magnetic suction, so that the sealing door 73 is capable of accurately covering the second opening 72 to prevent odor from leaking out through the second opening 72. Normally, the sealing door 73 is driven to close by the drive device 4. Often, due to accuracy issues, the sealing door 73 may not accurately cover the second opening 72, resulting in a certain gap between the sealing door 73 and the second opening 72. By mutual magnetic attraction between the first magnetic suction member 731 and the second magnetic suction member 732, the sealing door 73 can be pulled to fully cover the second opening 72 by magnetic attraction, so as to eliminate the gap between the sealing door 73 and the second opening 72.

In this embodiment, the drive device 4 includes a drive component 41 and a transmission component 42. The drive device 4 is used for driving the rotary drum 1 to rotate on the base 2. When the first opening 11 rotates with the rotary drum 1 from the initial position to the discharge position, the rotary drum 1 drives the sealing door 73 through the transmission component 42 to open the second opening 72, and the first opening 11 rotates with the rotary drum 1 to align with the second opening 72, so that the excreta can be discharged into the second accommodating space 71 through the first opening 11 and the second opening 72 via the excreta's own gravity. When the first opening 11 rotates with the rotary drum 1 towards the initial position from the discharge position, the pet litter in the third accommodating space 31 can pass through the sieve component 3 and fall back into the first accommodating space 111 via the pet litter's own gravity, and the rotary drum 1 drives the sealing door 73 through the transmission component 42 to close the second opening 72. The transmission component 42 includes a first transmission member 421 and a second transmission member 422. The first transmission member 421 is located on an outer side wall of the rotary drum 1, and the second transmission member 422 is located on the sealing door 73. When the first opening 11 rotates with the rotary drum 1 to the discharge position from the initial position, the first transmission member 421 is connected to the second transmission member 422 via transmission. The rotation of the rotary drum 1 drives the first transmission member 421 to rotate, and the first transmission member 421 rotates to drive the second transmission member 422 to move, so that the sealing door 73 moves with the second transmission member 422 to open the second opening 72. The first opening 11 rotates with the rotary drum 1 to align with the second opening 72, so that the excreta can be discharged into the second accommodating space 71 through the first opening 11 and the second opening 72 via the excreta's own gravity. When the first opening 11 rotates with the rotary drum 1 towards the initial position from the discharge position, the first transmission member 421 is connected to the second transmission member 422 via transmission. The pet litter in the third accommodating space 31 can pass through the sieve component 3 and fall back into the first accommodating space 111 through the pet litter's own gravity. The rotation of the first transmission member 421 drives the second transmission member 422 to move, so that the sealing door 73 moves with the second transmission member 422 to close the second opening 72. Specifically, a slide rail 74 is installed on the excreta collecting box 7. The rotation of the rotary drum 1 drives the first transmission member 421 to rotate, and the rotation of the first transmission member 421 drives the second transmission member 422 to move, so that the sealing door 73 slides with the second transmission member 422 on the slide rail 74 to open or close the second opening 72. Furthermore, the first transmission member 421 is an arc-shaped first rack set along an outer wall of the rotary drum 1. The sealing door 73 is in a flat shape. The second transmission member 422 is a flat shaped second rack set on the sealing door 73. The slide rail 74 is in a flat shape. The rotation of the rotary drum 1 drives the first rack to rotate, and the first rack drives the second rack to move, so that the sealing door 73 slides with the second rack on the slide rail 74 to open or close the second opening 72. Through the above structure, a setting of the drive device 4 is effectively achieved. The drive component 41 drives the rotary drum 1 to rotate on the base 2. The rotation of the rotary drum 1 drives the first rack to rotate. When the rotary drum 1 rotates from the initial position to the discharge position, the first rack meshes with the second rack, so that the first rack drives the second rack to move, the sealing door 73 slides with the second rack on the slide rail 74 to open the second opening 72, the sealing door 73 slides with the second transmission member 422 on the slide rail 74 to open the second opening 72, so that the excreta can be discharged into the second accommodating space 71 of the excreta collecting box 7 via the excreta's own gravity through the first opening 11, the third opening 28 and the second opening 72. When the rotary drum 1 rotates towards the initial position from the discharge position, the first opening 11 rotates to be staggered with the second opening 72 and the third opening 28, and the first rack meshes with the second rack to drive the second rack to move, so that the sealing door 73 slides with the second rack on the slide rail 74 to close the second opening 72, preventing the odor of the excreta from spreading into a living environment.

In this embodiment, the drive component 41 includes a drive motor 411, a driving gear 412, and a driven gear 413. The drive motor 411 is equipped with a drive shaft, and the driving gear 412 is set on the drive shaft. The driven gear 413 is set on the rotary drum 1, and the driven gear 413 meshes with the driving gear 412, so that the rotation of the drive shaft drives the driving gear 412 to rotate, the rotation of the driving gear 412 drives the driven gear 413 to rotate, and the rotation of the the driven gear 413 drives the rotary drum 1 to rotate on the base 2. Through the above structure, the driving gear 412 drives the driven gear 413 to rotate, so as to drive the rotary drum 1 to rotate, so that the rotary drum 1 is rotatable between the initial position and the discharge position. The pet toilet further includes a motor installation bracket 4112. The motor installation bracket 4112 is detachably connected to the base, and the motor installation bracket 4112 locks the drive motor to the base.

In this embodiment, an installation slot 2212 is further provided below the first support groove 221. The installation slot 2212 is in communication with the first support groove 221. The driving gear 412 is located inside the installation slot 2212, and an inner wall of the installation slot 2212 is provided with a fourth opening 2213. The installation slot 2212 is in communication with an outside world through the fourth opening 2213. Through the above structure, if pet litter enters the first support groove 221 and the installation slot 2212, the pet litter can be discharged to the outside world through the fourth opening 2213, effectively preventing the pet litter from blocking the first support groove 221 and the installation slot 2212, so as to prevent the pet litter from jamming the driving gear 412 and driven gear 413 due to accumulation of the pet litter, thereby allowing the rotary drum 1 to rotate more smoothly on the support arms. In this embodiment, the excreta collecting box 7 is further equipped with a first avoidance groove 75. The first avoidance groove 75 is used for avoiding the first rack and the second rack. Through the above structure, the first avoidance groove 75 is capable of avoiding the first rack and the second rack, allowing the second rack and the sealing door 73 to slide more smoothly on the slide rail 74, and also allowing the first rack to rotate more smoothly with the rotary drum 1 to drive the second rack and the sealing door 73 to slide.

In this embodiment, the excreta collecting box 7 includes a collection bin 76 and a first installation cover 77. The second accommodating space 71 is provided in the collection bin 76. The second opening 72 is provided on the first installation cover 77. The first installation cover 77 is detachably connected to the collection bin 76. The sealing door 73 is connected to the first installation cover 77, and the sealing door 73 is capable of sliding on the first installation cover 77 to open or cover the second opening 72. The collection bin 76 is equipped with a first hanging part 761 and a second hanging part 762. The first hanging part 761 and/or the second hanging part 762 are elastic hanging parts. The first hanging part 761 is used for hanging one end of a drawstring garbage bag, and the second hanging part 762 is used for hanging the other end of the drawstring garbage bag. Through the above structure, since the first hanging part 761 and/or the second hanging part 762 are elastic hanging parts, the first hanging part 761 and/or the second hanging part 762 is capable of undergoing elastic deformation by pulling a drawstring of the drawstring garbage bag, so that the drawstring garbage bag is capable of detaching from the first hanging part 761 and/or the second hanging part 762, and one end of the drawstring garbage bag is capable of approaching the other end to close the bag mouth of the drawstring garbage bag, thereby preventing the odor of the excreta in the garbage bag from leaking out.

In this embodiment, the first installation cover 77 is provided with a drawstring opening 771. The drawstring opening 771 is in communication with the second accommodating space 71 of the collection bin 76. The drawstring opening 771 is used for the drawstring of the drawstring garbage bag to be threaded out of the collection bin 76 and the first installation cover 77. Through the above structure, because the drawstring opening 771 is provided, the drawstring of the drawstring garbage bag can be pulled without opening the first installation cover 77 to allow the first hanging part 761 and/or the second hanging part 762 undergo elastic deformation, so that the drawstring garbage bag can be separated from the first hanging part 761 and/or the second hanging part 762, and one end of the drawstring garbage bag closes to the other end to close the bag mouth of the drawstring garbage bag, thereby preventing the odor of the excreta in the garbage bag from leaking out. After that, the first installation cover 77 is opened to remove the garbage bag. It is not only easy to replace the drawstring garbage bag, but also during an entire replacement process, the odor of the excreta in the drawstring garbage bag will not leak out, further improving user experience. In particular, a snap cover 7711 is provided at the drawstring opening 771. The snap cover 7711 detachably covers the drawstring opening 771, enabling the user to open the snap cover, so as to open the drawstring opening and pull the drawstring of the drawstring garbage bag.

In this embodiment, the pet toilet further includes a third locking buckle 78 and a third elastic member 781. The third locking buckle 78 includes a third connecting end 782, a third locking hook end 783, and a third pushing end 784. The third connecting end 782 is located between the third locking hook end 783 and the third pushing end 784. The third connecting end 782 is rotatably connected to the first installation cover 77. A lower side of the base 2 is provided with a stop edge 201. The third elastic member 781 is sleeved on the third locking buckle 78, and the third elastic member 781 pushes and presses the third locking hook end 783 against the stop edge 201, so that the stop edge 201 blocks the excreta collecting box 7 below the base 2. Under an action of external force, the third pushing end 784 is capable of pushing the third locking hook end 783 to rotate and detach from the stop edge 201. Through the above structure, by pushing the third pushing end 784, the third locking hook end 783 is capable of rotating and detaching from the stop edge 201, making it easy for the user to remove the excreta collecting box 7 and clean the excreta collecting box 7. After cleaning, the excreta collecting box 7 can be pushed to a lower part of the base 2 and stopped below the base 2 through the stop edge 201 and the third locking hook end 783.

In this embodiment, the excreta collecting box 7 further includes a decorative cover 79. The decorative cover 79 is detachably connected to the first installation cover 77, and the decorative cover 79 is capable of keeping the sealing door 73 on the first installation cover 77. The slide rail 74 is installed on the first installation cover 77. Through the above structure, the installation of the sealing door 73 is effectively achieved, enabling the sealing door 73 stably slide on the first installation cover 77.

In this embodiment, a lower side of the first installation cover 77 is equipped with a deodorization box installation slot 772. The deodorization box installation slot 772 is used for installing a deodorization box. Through the above structure, the deodorization box is capable of eliminating the odor of the excreta in the excreta collecting box 7, and by installing the deodorization box in the installation slot, it is convenient for the user to replace the deodorization box.

In this embodiment, the pet toilet further includes support feet 8. The support feet 8 are detachably connected to the base 2. The support foot 8 includes an installation part 81 and a support part 82. An upper side of the installation part 81 is detachably connected to the base 2, and a lower side of the installation part 81 is detachably connected to the support part 82. Through the above structure, due to a detachable connection between the support feet 8 and the base 2, it is easy to install, replace, and disassemble the support feet 8. By disassembling the support feet 8, it is convenient for transportation. Furthermore, since the installation part 81 and the support part 82 are detachable, the support feet 8 can be further disassembled for easier transportation. Additionally, the support part 82 and the installation part 81 can be separately formed, making it convenient for producing, improving production efficiency and yield.

In this embodiment, the lower side of the installation part 81 is provided with an installation annular groove 811. The support part 82 is provided with an annular installation protrusion 821. The installation protrusion 821 is connected to the installation annular groove 811. The installation part 81 includes a left housing 812 and a right housing 813. The left housing 812 is equipped with a left annular groove 8121, and the right housing 813 is equipped with a right annular groove 8131. The left housing 812 is detachably connected to the right housing 813 to form a whole, and the left annular groove 8121 is combined with the right annular groove 8131 to form the installation annular groove 811. Specifically, the installation part 81 of the support feet 8 is engaging with the base 2. Furthermore, the base 2 is equipped with insertion ports 202, and an inner wall of the insertion ports 202 is equipped with a plurality of bayonets 2021. An outer side wall of the installation part 81 of the support feet 8 is equipped with a plurality of fasteners 814. When the installation part 81 of the support feet 8 is inserted into the insertion ports 202, the fasteners 814 is connected to the bayonets 2021 to combine the support feet 8 with the base 2 as a whole. Furthermore, a lower side of the fasteners 814 is connected to the outer side wall of the installation part 81 of the support feet 8. A slit 815 is provided between the fasteners 814 and the outer side wall of the installation part 81 of the support feet 8. The slit 815 surrounds an upper side, left side, and right side of the buckle 814. Furthermore, the insertion ports 202 are further equipped with a first guide portion 2022, and the installation port 81 of the support feet 8 is also equipped with a second guide portion 816. When the support feet are inserted into the insertion ports 202, the first guide portion 2022 slides along the second guide portion 816 to connect the fasteners 814 to the bayonets 2021, and the support feet 8 are combined with the base 2 to form a whole. Furthermore, the first guide portion 2022 is a guide block located on an inner wall of the insertion ports 202, and the second guide portion 816 is a guide groove located on a side wall of the installation port 81 of the support feet 8. The support part 82 together with the installation part 81 forms an obtuse angle. Through the above structure, the connection between the installation part 81 and the support part 82 is effectively achieved, and the connection between the installation part 81 and the base 2 is achieved.

In this embodiment, the pet toilet further includes a sealing plate 203. The sealing plate 203 is detachably connected to a lower side of the base 2. The sealing plate 203 is used for covering an installation gap 204 between the support feet 8 and a side wall of the base 2. Through the above structure, the sealing plate 203 is capable of covering the installation gap 204 between the support feet 8 and the side wall of the base 2, preventing the pet from getting into the installation gap 204 between the support feet 8 and the side wall of the base 2, and making the lower side of the base 2 more flat and beautiful. The sealing plate 203 is used for covering the chassis insertion slot 53, the second insertion slot 271, the third insertion slot 272, and the fourth insertion slot 273. Through the above structure, the sealing plate 203 covers the chassis insertion slot 53, the second insertion slot 271, the third insertion slot 272, and the fourth insertion slot 273, not only making the base 2 more beautiful, but also protecting the chassis 5, the second infrared detection device 64, and the third infrared detection device 65 respectively inserted in the chassis insertion slot 53, the second insertion slot 271, the third insertion slot 272, and the fourth insertion slot 273.

In this embodiment, the first accommodating space 111 is provided with a plurality of raised skeletons 1111. The pet toilet further includes a cushion body 1112. The cushion body 1112 detachably covers the framework 1111 and a bottom surface of the first accommodating space 111. Through the above structure, the raised skeleton 1111 is capable of supporting the cushion body 1112, so that the cushion body 1112 is higher than the bottom surface of the first accommodating space 111. Therefore, the pet litter can be placed on the cushion body 1112 to reduce a capacity of the first accommodating space 111, making it convenient for the user to adjust an amount of cat litter. When a large amount of cat litter is needed, the cushion body 1112 can be detached to directly hold the cat litter on the bottom surface of the first accommodating space 111, so as to increase the capacity of the first accommodating space 111.

In this embodiment, a raised annular leak proof ring 1113 is provided in the first accommodating space 111. The annular leak proof ring 1113 is used for keeping the pet's excreta within the first accommodating space 111. Through the above structure, when the rotary drum 1 rotates, the annular leak proof ring 1113 can allow urine and other excreta placed in the first accommodating space 111 to penetrate outside the first accommodating space 111.

The first accommodating space 111 is further equipped with an annular stop protrusion 1114. The stop protrusion 1114 abuts against an upper side of the annular leak proof ring to keep the annular leak proof ring 1113 within the first accommodating space 111. A lower side of the annular leak proof ring 1113 abuts against an edge of the cushion body 1112 to keep the cushion body 1112 within the first accommodating space 111. Specifically, a stop groove 1115 is formed between the lower side of the annular leak proof ring 1113 and an inner wall of the first accommodating space 111. The lower side of the annular leak proof ring 1113 keeps the edge of the cushion body 1112 within the stop groove 1115. Through the above structure, the design is reasonable, the structure is simple, and a setting of the cushion body 1112 and the annular leak proof ring 1113 is effectively achieved.

In this embodiment, the excreta collecting box 7 is equipped with a first outer side wall 70 and a first bottom wall 701. The first bottom wall 701 is connected to the first outer side wall 70, and a distance between one side of the first bottom wall 701 and a bottom end of the first outer side wall 70 is a first distance. A distance between the other side of the first bottom wall 701 and the bottom end of the first outer side wall 70 is a second distance, and the first distance is different from the second distance, so that the first bottom wall 701 is set at an inclined angle. Through the above structure, when the excreta is discharged into the second accommodating space 71 of the excreta collecting box 7 through the second opening 72, the excreta is capable of sliding along the inclined surface from the other side of the first bottom wall 701 to one side of the first bottom wall 701, so as to prevent accumulation of the excreta on the other side of the first bottom wall 701 below the second opening 72.

In this embodiment, a middle part of the sieve component 3 is recessed towards an inner wall of the rotary drum 1 to form a diversion channel 32. Through the above structure, it is convenient for the excreta to be discharged into the excreta collecting box through the first opening 11 and the second opening 72 along the diversion channel 32.

The sieve component 3 includes a first part 33 and a second part 34. The first part 33 is connected to the rotary drum 1. The second part 34 is connected to the first part 33, and the second part 34 is located between the first accommodating space 111 and the first part 33, with a plurality of sieve holes 341 on the second part 34. Specifically, a depth of the diversion channel 32 increases from the second part 34 to the first part 33, while a width of the diversion channel 32 decreases from the second part 34 to the first part 33. Furthermore, the first part 33 includes a first baffle 331 and a second baffle 332. One side of the first baffle 331 is connected to the second part 34, and a middle part of the other side of the first baffle 331 is connected to a middle part of the rotary drum 1. Two ends of the other side of the first baffle 331 are connected to two ends of the rotary drum 1 via the second baffle 332. The second baffle 332 together with the first baffle 331 forms an acute angle, a right angle, or an obtuse angle. Meanwhile, the second baffle 332 is also capable of serving to block the pet litter, preventing the pet litter from splashing into an external environment when the rotary drum 1 rotates. In this embodiment, the first connecting member, the second connecting member, the third connecting member, the fourth connecting member and the fifth connecting member are all screws or bolts. The first elastic member, the second elastic member and the third elastic member are all torsion springs.

Referring to FIGS. 27 to 32, a pet toilet is further provided in the present invention.

The pet toilet includes a rotary drum 1. The rotary drum 1 is equipped with a first opening 11 and a first accommodating space 111. The first opening 11 is in communication with the first accommodating space 111, and the first accommodating space 111 is configured to accommodate pet excreta and pet litter.

The pet toilet includes a base 2, and the rotary drum 1 is supported by the base 2.

The pet toilet includes a sieve component 3, and the sieve component 3 is connected to the rotary drum 1. The sieve component 3 and an inner wall of the rotary drum 1 together form a third accommodating space 31. The third accommodating space 31 is adjacent to the first accommodating space 111. The sieve component 3 is configured to sieve the pet litter and the excreta.

The pet toilet includes a drive device 4, and the drive device 4 is configured to drive the rotary drum 1 to rotate on the base 2.

The pet toilet further includes an excreta collecting box 7. The excreta collecting box 7 is located below the base 2. The excreta collecting box 7 is equipped with a second accommodating space 71 and a second opening 72. The second opening 72 is in communication with the second accommodating space 71.

The pet toilet further includes a sealing door 73, and the sealing door 73 is located at the second opening 72 for opening or closing the second opening 72. When the first opening 11 rotates with the rotary drum 1 from the initial position to the discharge position, the pet litter can enter the third accommodating space 31 through the sieve component 3, the excreta is limited outside the third accommodating space 31, the drive device 4 drives the sealing door 73 to open the second opening 72, and the first opening 11 rotates with the rotary drum 1 to align with the second opening 72, so that the excreta can be discharged into the second accommodating space 71 through the first opening 11 and the second opening 72 via the excreta's own gravity. When the first opening 11 rotates towards the initial position with the rotary drum 1 from the discharge position, the first opening 11 and the second opening 72 are staggered, the pet litter in the third accommodating space 31 can pass through the sieve component 3 and fall back into the first accommodating space 111 via the pet litter's own gravity, and the drive device 4 drives the sealing door 73 to close the second opening 72.

The pet toilet further includes an elastic reset device 1001. The elastic reset device 1001 is connected to the sealing door 73 or the excreta collecting box. When the drive device 4 drives the sealing door 73 to open the second opening 72, the elastic reset device 1001 is configured to push the sealing door 73 back to an open position. When the drive device 4 drives the sealing door 73 to close the second opening 72, the elastic reset device 1001 is configured to push the sealing door 73 back to a closed position.

The pet toilet further includes an elastic reset device 1001. The elastic reset device 1001 is connected to the sealing door 73 or the excreta collecting box 7. When the drive device 4 drives the sealing door 73 to open the second opening 72, the elastic reset device 1001 is configured to push the sealing door 73 back to an open position. When the drive device 4 drives the sealing door 73 to close the second opening 72, the elastic reset device 1001 is configured to push the sealing door 73 back to a closed position.

Through the above structure, when the drive device 4 drives the sealing door 73 to close the second opening 72, the elastic reset device 1001 can push the sealing door 73 to cover the second opening 72, so as to accurately push the sealing door 73 to the closed position, so that the sealing door 73 can accurately cover the second opening 72, preventing odor from leaking out through the second opening 72. Under normal circumstances, the drive device 4 drives the sealing door 73 to close. Often, due to accuracy issues, the drive device 4 excessively pushes the sealing door 73, causing a certain gap between the sealing door 73 and the second opening 72. The elastic reset device 1001 can push the sealing door 73 to close the second opening 72, so as to accurately push the sealing door 73 to the closed position. The elastic reset force provided by the elastic reset device 1001 can push the sealing door 73 to fully cover the second opening 72, so as to eliminate the gap between the sealing door 73 and the second opening 72. When the drive device 4 drives the sealing door 73 to open the second opening 72, the elastic reset device 1001 can push the sealing door 73 to open the second opening 72, so as to accurately push the sealing door 73 to the open position, so that the sealing door 73 can accurately open the second opening 72. Usually, the drive device 4 drives the sealing door 73 to open. Often, due to accuracy issues, the drive device 4 may excessively push the sealing door 73, causing the sealing door 73 to be excessively opened. The elastic reset device 1001 can push the sealing door 73 to the open position, thereby accurately pushing the sealing door 73 to the open position. Furthermore, in general, during the process of the drive device 4 driving the sealing door 73 to open or close the second opening 72, the sealing door 73 is prone to displacement and deviation during the pushing process, resulting in the position of the sealing door 73 being offset. The elastic reset device 1001 can correct the position of the sealing door 73 by pushing, so that the sealing door 73 can work stably.

In this embodiment, the elastic reset device 1001 includes first elastic reset components 1002 and second elastic reset components 1003. One end of the first elastic reset components 1002 is connected to one side of the excreta collecting box 7. When the drive device 4 drives the sealing door 73 to open the second opening 72, the other end of the first elastic reset components 1002 pushes the sealing door 73 back to the open position. One end of the second elastic reset components 1003 is connected to the other side of the excreta collecting box 7. When the drive device 4 drives the sealing door 73 to close the second opening 72, the other end of the second elastic reset components 1003 pushes the sealing door 73 back to the closed position. The first elastic reset component 1002 includes a first spring member 10021 and a first ejector pin 10022. The first spring member 10021 is connected to one side of the excreta collecting box 7, and the first ejector pin 10022 is connected to the first spring member 10021. The second elastic reset component 1003 includes a second spring member 10031 and a second ejector pin 10032. The second spring member 10031 is connected to the other side of the excreta collecting box 7, and the second ejector pin 10032 is connected to the second spring member 10031. Specifically, the excreta collecting box 7 is equipped with a first installation slot 1004 and a second installation slot 1005. One end of the first spring member 10021 abuts against one side of an inner wall of the first installation slot 1004. One end of the first ejector pin 10022 is provided with a first nesting hole 1006. The other end of the first spring member 10021 is connected to the first nesting hole 1006. The other side of the inner wall of the first installation slot 1004 is provided with a first stop part 10041 and a first notch 10042. The first stop part 10041 keeps one end of the first ejector pin 10022 in the first installation slot 1004, and the other end of the first ejector pin 10022 passes through the first notch 10042 and out of the first installation slot 1004. When the drive device 4 drives the sealing door 73 to open the second opening 72, the other end of the first ejector pin 10022 pushes the sealing door 73 back to the open position. One end of the second spring member 10031 abuts against one side of an inner wall of the second installation slot 1005. One end of the second ejector pin 10032 is provided with a second nesting hole 1007. The other end of the second spring member 10031 is connected to the second nesting hole 1007. The other side of the inner wall of the second installation slot 1005 is provided with a second stop part 10051 and a second notch 10052. The second stop part 10051 keeps one end of the second ejector pin 10032 in the second installation slot 1005, and the other end of the second ejector pin 10032 passes through the second notch 10052 and out of the second installation slot 1005. When the drive device 4 drives the sealing door 73 to close the second opening 72, the other end of the second ejector pin 10032 pushes the sealing door 73 back to the closed position. Furthermore, the total number of the first elastic reset components 1002 is at least two, and at least two first elastic reset components 1002 are uniformly arranged along one side of the excreta collecting box 7 in sequence. The total number of the second elastic reset components 1003 is at least two, and at least two second elastic reset components 1003 are uniformly arranged along the other side of the excreta collecting box 7 in sequence. Through the above structure, the setting of the first elastic reset components 1002 and the second elastic reset components 1003 has been effectively achieved. The sealing door 73 can be precisely pushed to the open position through the first elastic reset components 1002, and the sealing door 73 can be precisely pushed to the closed position through the second elastic reset components 1003. The first elastic reset components 1002 and the second elastic reset components 1003 are capable of correcting the position of the sealing door 73 and preventing the position of the sealing door 73 from shifting.

The above description only describes embodiments of the present disclosure, and is not intended to limit the present disclosure; various modifications and changes can be made to the present disclosure. Any modifications, equivalent substitutions, and improvements made within the spirit and scope of the present disclosure are intended to be included within the scope of the present disclosure.

What is claimed is:

1. A pet toilet comprising:
   a rotary drum, the rotary drum being equipped with a first opening and a first accommodating space; wherein the first opening is in communication with the first accommodating space, and the first accommodating space is configured to accommodate pet excreta and pet litter;
   a base, the rotary drum being supported by the base; wherein a gap portion is disposed between the base and the rotary drum;
   a sieve component, the sieve component being connected to the rotary drum; wherein the sieve component and an inner wall of the rotary drum together surround to form a third accommodating space, the third accommodating space is adjacent to the first accommodating space, and the sieve component is configured to sieve the pet litter and the excreta;
   a drive device, the drive device being configured to drive the rotary drum to rotate on a first support arm and a second support arm of the base; wherein when the first opening rotates with the rotary drum from an initial position to a discharge position, the pet litter can enter the third accommodating space through the sieve component, and the excreta can be discharged through the first opening via the excreta's own gravity; when the first opening rotates towards the initial position with the rotary drum from the discharge position, the pet litter in the third accommodating space can pass through the sieve component and fall back into the first accommodating space via the pet litter's own gravity;
   a proximity sensor switch, the proximity sensor switch being disposed on the base; wherein the proximity sensor switch is arranged around the gap portion; the proximity sensor switch is electrically connected to the drive device; when the proximity sensor switch is triggered, the drive device stops operating;
   a first flip cover; and
   a second flip cover;
   wherein the base comprises a main body, the first support arm is connected to one side of the main body, the first support arm is configured to support one side of the rotary drum, and the second support arm is configured to support the other side of the rotary drum, and the first support arm is integrally formed with the main body, and the second support arm is integrally formed with the main body,
   wherein the first support arm is provided with a first support groove, and the second support arm is provided with a second support groove; said one side of the rotary drum is provided with a first support shaft, and the other side of the rotary drum is provided with a second support shaft; the first support shaft is located within the first support groove, and the first support shaft is rotatable within the first support groove; the second support shaft is located within the second support groove, and the second support shaft is rotatable within the second support groove,
   wherein one end of the first flip cover is rotatably connected to one side of the first support arm, and an other end of the first flip cover is detachably connected to an other side of the first support arm; the first flip cover covers the first support groove to keep the first support shaft in the first support groove; one end of the second flip cover is rotatably connected to one side of the second support arm, and an other end of the second flip cover is detachably connected to an other side of the second support arm; the second flip cover covers the second support groove to keep the second support shaft in the second support groove;
   wherein the pet toilet further comprising a first locking member and a second locking member, wherein the first flip cover is detachably connected to the first support arm through the first locking member, and the second flip cover is detachably connected to the second support arm through the second locking member,
   wherein the first locking member includes a first locking buckle, a first elastic member, and a first locking hole provided on the first support arm; the first locking buckle comprises a first connecting end, a first locking hook end and a first pushing end; the first connecting end is provided between the first locking hook end and the first pushing end, and the first connecting end is rotatably connected to the first flip cover; the first elastic member is connected to the first locking buckle, so as to push and lock the first locking hook end of the first locking buckle to the first locking hole; under an action of external force, the first pushing end is capable of pushing the first locking hook end to rotate and detach from the first locking hole; the second locking member comprises a second locking buckle, a second elastic member, and a second locking hole provided on the second support arm; the second locking buckle comprises a second connecting end, a second locking hook end, and a second pushing end; the second connecting end is provided between the second locking hook end and the second pushing end, and the second connecting end is rotatably connected to the second flip cover; the second elastic member is connected to the second locking buckle, so as to push and lock the second locking hook end of the second locking buckle to the second locking hole; under the action of external force, the second pushing end is capable of pushing the second locking hook end to rotate and detach from the second locking hole.

2. The pet toilet of claim 1, wherein the base comprises a left side wall, a right side wall, and a connecting wall connecting the left side wall and the right side wall; one end of the rotary drum is supported by the left side wall, and the other end of the rotary drum is supported by the right side wall; the gap portion is located between the connecting wall and the rotary drum, and the proximity sensor switch is disposed on the connecting wall.

3. The pet toilet of claim 1, wherein the proximity sensor switch comprises a first proximity sensing unit and a second proximity sensing unit; the connecting wall comprises a first connecting unit and a second connecting unit; the left side wall has a first end and a second end opposite to the first end; the right side wall has a third end and a fourth end opposite to the third end; the first end and the third end are connected by the first connecting unit, and the second end and the fourth end are connected by the second connecting unit; the gap portion comprises a first gap and a second gap; the first gap is located between the first connecting unit and the rotary drum, and the second gap is located between the second connecting unit and the rotary drum; the first proximity sensing unit is disposed on the first connecting unit, and the second proximity sensing unit is disposed on the second connecting unit; the first proximity sensing unit is arranged around the first gap, and the second proximity sensing unit is arranged around the second gap.

4. The pet toilet of claim 1, wherein the proximity sensor switch is a capacitive proximity sensor switch.

5. The pet toilet of claim 2, wherein the proximity sensor switch comprises a capacitive sensing plate and a proximity sensing area; the proximity sensing area is disposed on the connecting wall, and the capacitive sensing plate is located below the proximity sensing area.

6. The pet toilet of claim 5, wherein the capacitive sensing plate is a PCB board with its surface covered by a metallic conductor.

7. The pet toilet of claim 1, wherein the base is provided with a switch installation slot, and the proximity sensor switch is disposed within the switch installation slot.

8. The pet toilet of claim 7, wherein an upper side of the proximity sensor switch is located within the switch installation slot; and a lower side of the proximity sensor switch is provided with a raised stop edge.

9. The pet toilet of claim 1, wherein the first support groove is equipped with a plurality of first rollers, and the first rollers are supported by the first support shaft.

10. The pet toilet of claim 9, wherein the first support groove is equipped with a roller carrier, and the first rollers are rotatably located on the roller carrier.

11. The pet toilet of claim 10, wherein the first rollers are rotatably connected to the roller carrier through a first rotation shaft;
wherein the roller carrier is in an arc shape, a lower surface of the roller carrier abuts against the first support groove, and the plurality of first rollers are arranged uniformly along an upper surface of the roller carrier.;
wherein a lower surface of the roller carrier is provided with a first positioning groove, the first support groove is internally provided with a first positioning protrusion, and the first positioning groove is connected to the first positioning protrusion.

12. The pet toilet of claim 9, wherein a first annular groove is provided on the first support shaft, and the first rollers are rotatable within the first annular groove.

13. The pet toilet of claim 12, wherein a second annular groove is provided on the second support shaft, a first annular protrusion is provided within the second support groove, and the first annular protrusion is rotatably connected to the second annular groove.

14. The pet toilet of claim 12, wherein the main body of the base is further equipped with a concave part, and the concave part is concave in a direction away from the rotary drum, and a second roller is provided on the concave part; when the rotary drum is supported on the base, the second roller is supported on an outer side wall of the rotary drum.

15. The pet toilet of claim 11, wherein the second roller is rotatably connected to the main body through a second rotation shaft.

16. A pet toilet comprising:
a rotary drum, the rotary drum being equipped with a first opening and a first accommodating space; wherein the first opening is in communication with the first accommodating space, and the first accommodating space is configured to accommodate pet excreta and pet litter;
a base, the rotary drum being supported by the base; wherein a gap portion is disposed between the base and the rotary drum;
a sieve component, the sieve component being connected to the rotary drum; wherein the sieve component and an inner wall of the rotary drum together surround to form a third accommodating space, the third accommodating space is adjacent to the first accommodating space, and the sieve component is configured to sieve the pet litter and the excreta;
a drive device, the drive device being configured to drive the rotary drum to rotate on a first support arm and a second support arm of the base; wherein when the first opening rotates with the rotary drum from an initial position to a discharge position, the pet litter can enter the third accommodating space through the sieve component, and the excreta can be discharged through the first opening via the excreta's own gravity; when the first opening rotates towards the initial position with the rotary drum from the discharge position, the pet litter in the third accommodating space can pass through the sieve component and fall back into the first accommodating space via the pet litter's own gravity;
a proximity sensor switch, the proximity sensor switch being disposed on the base; wherein the proximity sensor switch is arranged around the gap portion; the proximity sensor switch is electrically connected to the drive device; when the proximity sensor switch is triggered, the drive device stops operating,
a first flip cover;
a second flip cover;
a first roller; and
a first shaft;
wherein the base comprises a main body, the first support arm is connected to one side of the main body, the first support arm is configured to support one side of the rotary drum, and the second support arm is configured to support the other side of the rotary drum, and the first support arm is integrally formed with the main body, and the second support arm is integrally formed with the main body,
wherein the first support arm is provided with a first support groove, and the second support arm is provided with a second support groove; said one side of the rotary drum is provided with a first support shaft, and the other side of the rotary drum is provided with a second support shaft the first support shaft is located within the first support groove, and the first support shaft is rotatable within the first support groove; the second support shaft is located within the second support groove, and the second support shaft is rotatable within the second support groove,
wherein one end of the first flip cover is rotatably connected to one side of the first support arm, and an other end of the first flip cover is detachably connected to an other side of the first support arm; the first flip cover covers the first support groove to keep the first support shaft in the first support groove; one end of the second flip cover is rotatably connected to one side of the second support arm, and an other end of the second flip cover is detachably connected to an other side of the second support arm; the second flip cover covers the second support groove to keep the second support shaft in the second support groove;

wherein the pet toilet further comprising a first locking member and a second locking member, wherein the first flip cover is detachably connected to the first support arm through the first locking member, and the second flip cover is detachably connected to the second support arm through the second locking member, wherein the first flip cover comprises a first housing unit and a second housing unit; the first housing unit is detachably connected to the second housing unit, and the first housing unit is provided with a first installation shaft hole; the second housing unit is provided with a second installation shaft hole, and the first roller rotatably sleeves a first rotation shaft; one end of the first shaft is inserted into the first installation shaft hole, and an other end of the first shaft is inserted into the second installation shaft hole; the first roller abuts against the first support shaft and is rotatable within the first annular groove;

wherein the second flip cover comprises a third housing unit and a fourth housing unit, and the third housing unit is detachably connected to the fourth housing unit; a second annular protrusion is provided on the third housing unit or the fourth housing unit, and the second annular protrusion is rotatably connected to the second annular groove;

wherein the first flip cover is further equipped with a first stop groove, and the second flip cover is further equipped with a second stop groove; the first stop groove covers an upper half of the first support shaft, and the first support groove supports a lower half of the first support shaft; the second stop groove covers an upper half of the second support shaft, and the second support groove supports a lower half of the second support shaft;

wherein the third roller is located inside the first stop groove, and the second annular protrusion is located inside the second stop groove.

\* \* \* \* \*